US012284658B2

(12) United States Patent
Yang et al.

(10) Patent No.: US 12,284,658 B2
(45) Date of Patent: Apr. 22, 2025

(54) DEVICE-TO-DEVICE D2D TRANSMISSION METHOD AND COMMUNICATION APPARATUS

(71) Applicant: HUAWEI TECHNOLOGIES CO., LTD., Guangdong (CN)

(72) Inventors: Mao Yang, Xi'an (CN); Yuchen Guo, Shenzhen (CN); Yunbo Li, Shenzhen (CN); Bo Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 17/857,800

(22) Filed: Jul. 5, 2022

(65) Prior Publication Data

US 2022/0346072 A1  Oct. 27, 2022

Related U.S. Application Data

(63) Continuation of application No. PCT/CN2021/070597, filed on Jan. 7, 2021.

(30) Foreign Application Priority Data

Jan. 7, 2020  (CN) .......................... 202010015812.9

(51) Int. Cl.
*H04W 72/04* (2023.01)
*H04L 5/00* (2006.01)
(Continued)

(52) U.S. Cl.
CPC .......... *H04W 72/23* (2023.01); *H04L 5/0007* (2013.01); *H04W 4/70* (2018.02); *H04W 28/0278* (2013.01); *H04W 84/12* (2013.01)

(58) Field of Classification Search
CPC ... H04W 72/23; H04W 4/70; H04W 28/0278; H04W 84/12; H04W 92/18; H04W 12/06; H04L 5/0007; H04L 5/0053; H04L 5/0094
(Continued)

(56) References Cited

U.S. PATENT DOCUMENTS

2016/0073349 A1    3/2016  Mohan et al.
2016/0261327 A1*   9/2016  Merlin .................. H04L 1/0027
(Continued)

FOREIGN PATENT DOCUMENTS

| CN | 103781114 A | 5/2014 |
|---|---|---|
| CN | 104159221 A | 11/2014 |
| CN | 104954968 A | 9/2015 |

OTHER PUBLICATIONS

Baron et al., "Direct Link MU Transmissions," IEEE 802.11-19/1117r2, Sep. 15, 2019, 11 pages.
(Continued)

*Primary Examiner* — Candal Elpenord
(74) *Attorney, Agent, or Firm* — Fish & Richardson P.C.

(57) ABSTRACT

This application discloses example device-to-device (D2D) transmission methods and communication apparatuses. One example method includes receiving, by a station, a trigger frame sent by an access point, where the trigger frame includes a user information field, the user information field includes an identifier of the station, resource allocation information, first indication information, and second indication information, the first indication information indicates that a resource unit indicated by the resource allocation information is used for D2D transmission, and the second indication information indicates that the station is a sender or a receiver of the D2D transmission. The D2D transmis-
(Continued)

sion is performed by the station on the resource unit indicated by the resource allocation information.

20 Claims, 23 Drawing Sheets

(51) Int. Cl.
    *H04W 4/70* (2018.01)
    *H04W 28/02* (2009.01)
    *H04W 72/23* (2023.01)
    *H04W 84/12* (2009.01)

(58) Field of Classification Search
    USPC .................................................. 370/329–330
    See application file for complete search history.

(56) References Cited

U.S. PATENT DOCUMENTS

| | | | | |
|---|---|---|---|---|
| 2017/0070914 A1* | 3/2017 | Chun | .................... | H04L 1/0075 |
| 2017/0303268 A1* | 10/2017 | Ghosh | ................. | H04W 74/006 |
| 2018/0205441 A1* | 7/2018 | Asterjadhi | .......... | H04W 72/044 |
| 2018/0213379 A1* | 7/2018 | Xiong | .................... | H04W 4/70 |
| 2018/0249421 A1* | 8/2018 | Bharadwaj | .......... | H04W 52/241 |
| 2019/0124556 A1* | 4/2019 | Verma | .................. | H04L 5/0064 |

OTHER PUBLICATIONS

IEEE Std 802.11-2016, "IEEE Standard for Information Technology—Telecommunications and Information Exchange Between Systems Local and Metropolitan Area Networks—Specific Requirements, Part 11: Wireless LAN Medium Access Control (MAC) and Physical Layer (PHY) Specifications," Dec. 7, 2016, 3534 pages.

IEEE P802.11ax/D4.3, "Draft Standard for Information Technology—Tele-Communications and Information Exchange Between Systems Local and Metropolitan Area Networks—Specific Requirements, Part 11: Wireless LAN Medium Access Control (MAC) and Physical Layer (PHY) Specifications," Aug. 2019, 782 pages.

International Search Report and Written Opinion in International Appln. No. PCT/CN2021/070597, mailed on Mar. 29. 2021, 15 pages (with English translation).

* cited by examiner

DEVICE-TO-DEVICE D2D TRANSMISSION METHOD AND COMMUNICATION APPARATUS

CROSS-REFERENCE TO RELATED APPLICATIONS

This application is a continuation of International Application No. PCT/CN2021/070597, filed on Jan. 7, 2021, which claims priority to Chinese Patent Application No. 202010015812.9, filed on Jan. 7, 2020. The disclosures of the aforementioned applications are hereby incorporated by reference in their entireties.

TECHNICAL FIELD

This application relates to the communication field, and in particular, to a device-to-device D2D transmission method and a communication apparatus.

BACKGROUND

The Institute of Electrical and Electronics Engineers (institute of electrical and electronic engineers, IEEE) organization introduces orthogonal frequency division multiple access (orthogonal frequency division multiple access, OFDMA) uplink transmission in a wireless local area network (wireless local area network, WLAN) standard 802.11ax. An OFDMA-based uplink transmission procedure in a WLAN is as follows: An access point (access point, AP) sends a trigger frame (trigger frame, TF) after obtaining a channel resource through contention. The trigger frame indicates several resource units (resource unit, RU). The resource units are allocated to a specified non-access point station (none access point station, non-AP STA) to perform uplink transmission or uplink random access. After receiving the trigger frame, the non-AP STA transmits uplink data in an OFDMA manner on a corresponding RU. After receiving the uplink data, the AP sends a block acknowledgment frame (block ACK, BA) to all non-AP STAs that transmit the uplink data.

A next-generation wireless network needs to support a real-time interactive service, such as wireless remote control, wireless projection, direct printing, virtual reality, and augmented reality. Therefore, it is urgent to implement D2D transmission in a wireless fidelity (wireless fidelity, WiFi) system. Device-to-device (device-to-device, D2D) transmission is a transmission manner in which data is directly transmitted between two non-AP STAs without passing through an AP. How to implement the D2D transmission in the Wi-Fi system is a problem that needs to be urgently resolved at present.

SUMMARY

This application provides a device-to-device D2D transmission method and a communication apparatus, to implement D2D transmission in a Wi-Fi system.

According to a first aspect, this application provides a D2D transmission method, where the method includes: A station receives a trigger frame sent by an access point, where the trigger frame includes a user information field, the user information field includes an identifier of the station, resource allocation information, first indication information, and second indication information, the first indication information indicates that a resource unit indicated by the resource allocation information is used for device-to-device D2D transmission, and the second indication information indicates that the station is a sender or a receiver of the D2D transmission; and the station performs the D2D transmission on the resource unit indicated by the resource allocation information. According to the method described in the first aspect, the D2D transmission can be implemented in a WI-Fi system.

In a possible implementation, the user information field includes 48 bits. This possible implementation can improve system compatibility. The possible implementation may be further applied to a second aspect described below, and details are not described in the second aspect.

In a possible implementation, the first indication information is located at a $40^{th}$ bit of the user information field. Based on this possible implementation, a reserved bit in the 802.11ax standard can be modified to carry the first indication information. In this way, a new bit does not need to be added to the user information field to carry the first indication information, thereby saving bits in the user information field. The possible implementation may be further applied to the following second aspect, and details are not described in the second aspect.

In a possible implementation, the second indication information is located at a $46^{th}$ bit of the user information field. Based on this possible implementation, a reserved bit in the 802.11ax standard can be modified to carry the second first indication information. In this way, a new bit does not need to be added to the user information field to carry the second indication information, thereby saving bits in the user information field. The possible implementation may be further applied to the following second aspect, and details are not described in the second aspect.

According to a second aspect, this application provides a D2D transmission method, where the method includes: An access point generates a trigger frame, where the trigger frame includes a user information field, the user information field includes an identifier of a station, resource allocation information, first indication information, and second indication information, the first indication information indicates that a resource unit indicated by the resource allocation information is used for device-to-device D2D transmission, and the second indication information indicates that the station is a sender or a receiver of the D2D transmission; and the access point sends the trigger frame. According to the method described in the second aspect, the D2D transmission can be implemented in a system.

According to a third aspect, this application provides a D2D transmission method, where the method includes: A first station receives a trigger frame sent by an access point, where the trigger frame includes a user information field, the user information field includes an identifier of the first station, resource allocation information, first indication information, and first identification information, the first station is a sender of the D2D transmission, the first indication information indicates that a resource unit indicated by the resource allocation information is used for the D2D transmission, the first identification information is an identifier of a second station, the second station is a receiver of the D2D transmission, or the first identification information is a link identifier for the D2D transmission; and the first station sends data to the second station on the D2D transmission resource unit indicated by the resource allocation information. If the first identification information is the link identifier for the D2D transmission, after receiving the trigger frame, the first station determines, based on the link identifier for the D2D transmission, that the second station is the receiver of the D2D transmission. After determining that the second station is the receiver of the D2D transmission, the first station sends the data to the second station on the resource unit indicated by the resource allocation information. According to the method described in the third aspect, the D2D transmission can be implemented in a Wi-Fi system.

In a possible implementation, the first identification information may be a partial identifier or a complete identifier of the second station.

In a possible implementation, the user information field in the trigger frame includes 48 bits. This possible implementation can improve system compatibility. This possible implementation may be further applied to a fourth aspect and a fifth aspect, and details are not described in the fourth aspect and the fifth aspect.

In a possible implementation, the first indication information is located at a $40^{th}$ bit (B39) of the user information field; or the first indication information is located at a $12^{th}$ bit (B11) of the user information field; or the first indication information is located at a $46^{th}$ bit (B45) of the user information field. In other words, the first indication information is located at a sixth bit (B5) of a trigger dependent user information field (trigger dependent user info) in the first user information field. This possible implementation can save bits of the user information field. This possible implementation may be further applied to the fourth aspect and the fifth aspect, and details are not described in the fourth aspect and the fifth aspect.

In a possible implementation, the first identification information is located at a $33^{rd}$ bit (B32) to a $39^{th}$ bit (B38) of the user information field. Based on this possible implementation, in the D2D transmission, a UL Target RSSI subfield (B32 to B38) of the user information field may be reused to carry the first identification information. This helps save bits of the user information field. This possible implementation may be further applied to the fourth aspect and the fifth aspect, and details are not described in the fourth aspect and the fifth aspect.

According to a fourth aspect, this application provides a D2D transmission method, where the method includes: A second station receives a trigger frame sent by an access point, where the trigger frame includes a user information field, the user information field includes an identifier of the first station, resource allocation information, first indication information, and first identification information, the first station is a sender of the D2D transmission, the first indication information indicates that a resource unit indicated by the resource allocation information is used for the D2D transmission, the first identification information is an identifier of a second station, the second station is a receiver of the D2D transmission, or the first identification information is a link identifier fir the D2D transmission; and the second station receives data sent by the first station on a D2D transmission resource unit allocated by the resource allocation information. If the first identification information is the link identifier for the D2D transmission, after receiving the trigger frame, the second station determines, based on the link identifier for the D2D transmission, that the second station is the receiver of the D2D transmission. After determining that the second station is the receiver of the D2D transmission, the second station receives, on the resource unit indicated by the resource allocation information, the data sent by the second station. According to the method described in the fourth aspect, the D2D transmission can be implemented in a Wi-Fi system.

According to a fifth aspect, this application provides a D2D transmission method, where the method includes: An access point generates a trigger frame, where the trigger frame includes a user information field, the user information field includes an identifier of the first station, resource allocation information, first indication information, and first identification information, the first station is a sender of the D2D transmission the first indication information indicates that a resource unit indicated by the resource allocation information is used for the D2D transmission, the first identification information is an identifier of a second station, the second station is a receiver of the D2D transmission, or the first identification information is a link identifier for the D2D transmission; and the access point sends the trigger frame. According to the method described in the fifth aspect, the D2D transmission can be implemented in a Wi-Fi system.

According to a sixth aspect, this application provides a D2D transmission method, where the method includes: A first station receives a trigger frame sent by an access point, where a user information field in the trigger frame includes a link identifier for D2D transmission and resource allocation information for the D2D transmission; the first station determines that the first station is a sender of a D2D transmission link based on the link identifier for the D2D transmission, and determines that a second station is a receiver of the D2D transmission link; and the first station sends data to the second station on a D2D transmission resource unit indicated by the resource allocation information. According to the method described in the sixth aspect, the D2D transmission can be implemented in a Wi-Fi system.

In a possible implementation, the user information field in the trigger frame includes 48 bits. This possible implementation can improve system compatibility. This possible implementation may be further applied to a seventh aspect and an eighth aspect, and details are not described in the seventh aspect and the eighth aspect.

In a possible implementation, the link identifier for the D2D transmission is located at a first bit (B0) to a $12^{th}$ bit (B11) of the user information field. Based on this possible implementation, during the D2D transmission, an AID12 subfield (B0 to B11) in a user field may be reused to carry the link identifier for the D2D transmission. This helps save bits of the user information field. This possible implementation may be further applied to the seventh aspect and the eighth aspect, and details are not described in the seventh aspect and the eighth aspect.

In a possible implementation, when the link identifier for D2D transmission is located at the first bit (B0) to the $12^{th}$ bit (B11) of the user information field, the link identifier for the D2D transmission is different from an identifier of any station associated with the access point. This helps prevent the station from interpreting the link identifier for the D2D transmission as an identifier of the station. This possible implementation may be further applied to the seventh aspect and the eighth aspect, and details are not described in the seventh aspect and the eighth aspect.

In a possible implementation, the user information field further includes first indication information, and the first indication information indicates that a resource unit indicated by the resource allocation information is used for the D2D transmission. This possible implementation facilitates the station to distinguish whether the resource unit indicated at the user information field is used for the D2D transmission or uplink transmission. This possible implementation may be further applied to the seventh aspect and the eighth aspect, and details are not described in the seventh aspect and the eighth aspect.

In a possible implementation, the first indication information may be located at the first bit (B0) to the $12^{th}$ bit (B11) of the user information field. Based on this possible implementation, during the D2D transmission, the AID12 subfield (B0 to B11) in the user field may be reused to carry the first indication information. This helps save bits of the user information field. This possible implementation may be further applied to the seventh aspect and the eighth aspect, and details are not described in the seventh aspect and the eighth aspect.

In a possible implementation, when the first indication information may be in the first bit (B0) to the $12^{th}$ bit (B11) of the user information field, the link identifier for the D2D transmission is located at a $33^{rd}$ bit (B32) to a $39^{th}$ bit (B38) of the user information field, or the link identifier for the D2D transmission is located at the $33^{rd}$ bit (B32) to a $40^{th}$ bit (B39) of the user information field. Based on this possible implementation, during the D2D transmission, a UL Target RSSI subfield (B32 to B38) of the user information field may be reused to carry the link identifier for the D2D transmission. This helps save bits of the user information field. This possible implementation may be further applied to the seventh aspect and the eighth aspect, and details are not described in the seventh aspect and the eighth aspect.

In a possible implementation, when the first indication information indicates that the resource unit indicated by the resource allocation information is used for the D2D transmission, the first indication information is located at an AID11 subfield (B0 to B10) or the AID12 subfield (B0 to B11). The first indication information may be a special value, for example, may be any one of 2008 to 2044 and 2047 to 4094, to indicate that the resource unit indicated by the resource allocation information is used for the D2D transmission.

According to the seventh aspect, this application provides a D2D transmission method, where the method includes: A second station receives a trigger frame sent by an access point, where a user information field in the trigger frame includes a link identifier for D2D transmission and resource allocation information for the D2D transmission; the second station determines that the second station is a receiver of the D2D transmission link; and the second station receives, on a D2D transmission resource unit indicated by the resource allocation information, data sent by a first station. According to the method described in the seventh aspect, the D2D transmission can be implemented in a Wi-Fi system.

According to the eighth aspect, this application provides a D2D transmission method, where the method includes: An access point generates a trigger frame, where a user information field in the trigger frame includes a link identifier for D2D transmission and resource allocation information of the D2D transmission; and the access point sends the trigger frame. According to the method described in the eighth aspect, the D2D transmission can be implemented in a Wi-Fi system.

According to a ninth aspect, this application provides a D2D transmission method, where the method includes: A first station receives a downlink PPDU sent by an access point, where a preamble of the downlink PPDU carries resource allocation information and a link identifier for D2D transmission, and the resource allocation information indicates a resource unit for the D2D transmission; the first station determines that the first station is a sender of the D2D transmission link based on the link identifier for the D2D transmission, and determines that the second station is a receiver of a D2D transmission link; and the first station sends data to the second station on a D2D transmission resource unit indicated by the resource allocation information. According to the method described in a tenth aspect, the D2D transmission can be implemented in a Wi-Fi system. According to the method described in the ninth aspect, the D2D transmission can be implemented in a Wi-Fi system.

In a possible implementation, the preamble further includes first indication information, and the first indication information indicates that a resource unit indicated by the resource allocation information is used for the D2D transmission. This possible implementation facilitates the station to distinguish whether the resource unit allocated at the user information field is used for the D2D transmission or downlink transmission. The possible implementation may be further applied to the tenth aspect and an eleventh aspect, and details are not described in the tenth aspect and the eleventh aspect.

In a possible implementation, the first indication information is located at a first bit (B0) to an $11^{th}$ bit (B10) of a user domain of the preamble. This possible implementation can save bits of the user information field. The possible implementation may be further applied to the tenth aspect and the eleventh aspect, and details are not described in the tenth aspect and the eleventh aspect.

In a possible implementation, the $12^{th}$ (B11) to the $21^{st}$ bit (B20) of the user domain of the preamble carry the link identifier for the D2D transmission.

According to a tenth aspect, this application provides a D2D transmission method, where the method includes: A second station receives a downlink PPDU sent by an access point, where a preamble of the downlink PPDU carries resource allocation information and a link identifier for D2D transmission, and the resource allocation information indicates a resource unit for the D2D transmission; the second station determines that the second station is a receiver of a D2D transmission link based on the link identifier for the D2D transmission; and the second station receives, on a D2D transmission resource unit indicated by the resource allocation information data, data sent by a first station. According to the method described in a tenth aspect, the D2D transmission can be implemented in a Wi-Fi system.

According to the eleventh aspect, this application provides a D2D transmission method, where the method includes: An access point generates a downlink PPDU, where a preamble of the downlink PPDU carries resource allocation information and a link identifier for D2D transmission, and the resource allocation information indicates a resource unit for the D2D transmission; and the access point sends the downlink PPDU. According to the method described in the eleventh aspect, the D2D transmission can be implemented in a Wi-Fi system.

According to a twelfth aspect, this application provides a requirement reporting method, where the method includes: A station generates a requirement report frame, where the requirement report frame indicates that the station needs to perform D2D transmission; and the station sends the requirement report frame to an access point. According to the method described in the twelfth aspect, the station can feed back a D2D transmission requirement to the access point, so that the access point can allocate a D2D transmission resource to the station.

In a possible implementation, the requirement report frame includes requirement report information, and the requirement report information includes one or more pieces of the following information: an identifier of a receiver of the D2D transmission, information used to determine a traffic volume size of the D2D transmission, and a service type of the D2D transmission. Based on the possible implementation, the station can notify the access point of the receiver of the D2D transmission, the traffic volume size of the D2D transmission, and the service type of the D2D transmission.

In a possible implementation, the requirement report information is carried in a control information field of a high efficient control HE-control field in the requirement report frame.

In a possible implementation, the requirement report frame further includes a control identifier, and the control identifier indicates that the control information field carries the requirement report information for the D2D transmission. Based on this possible implementation, it is helpful for the access point to identify a function of the requirement report frame.

In a possible implementation, the control identifier is carried in a control identifier field of the high efficient control HE-control field in the requirement report frame.

In a possible implementation, the station may further receive a requirement report trigger frame sent by the access point, where the requirement report trigger frame is a buffer report trigger frame. Based on this possible implementation, the access point may trigger, by using an existing trigger frame, the station to send the requirement report frame, and does not need to redesign a trigger frame to trigger the station to send the requirement report frame.

In a possible implementation, the buffer report trigger frame includes third indication information, and the third indication information indicates that the station is allowed to send the requirement report frame for the D2D transmission. Based on this possible implementation, the station may be triggered to send the requirement report frame only by making a small change to the existing trigger frame.

In a possible implementation, the third indication information is located at a $40^{th}$ bit of a user information field in the buffer report trigger frame. Based on this possible implementation, a reserved bit in the 802.11ax standard can be modified to carry the third indication information. This helps save bits of the user information field.

The method described in the twelfth aspect may be combined with the method described in the first aspect, the third aspect, the sixth aspect, or the ninth aspect. Alternatively, the method described in the twelfth aspect may be independently implemented.

According to a thirteenth aspect, this application provides a requirement reporting method, where the method includes: An access point receives a requirement report frame sent by a station, where the requirement report frame indicates that the station needs to perform D2D transmission. Optionally, after receiving the requirement report frame sent by the station, the access point generates a trigger frame, where the trigger frame triggers the station to perform the D2D transmission.

In a possible implementation, the requirement report frame further includes requirement report information, and the requirement report information includes one or more pieces of the following information: an identifier of a receiver of the D2D transmission, information used to determine a traffic volume size of the D2D transmission, and a service type of the D2D transmission.

In a possible implementation, the requirement report information is carried in a control information field of a high efficient control HE-control field in the requirement report frame In a possible implementation, the requirement report frame further includes a control identifier, and the control identifier indicates that the control information field carries the requirement report information for the D2D transmission.

In a possible implementation, the control identifier is carried in a control identifier field of the high efficient control HE-control field in the requirement report frame.

In a possible implementation, the access point may further send a requirement report trigger frame to the station, where the requirement report trigger frame is a buffer report trigger frame.

In a possible implementation, the buffer report trigger frame includes third indication information, and the third indication information indicates that the station is allowed to send the requirement report information for the D2D transmission.

In a possible implementation, the third indication information is located at a $40^{th}$ bit of a user information field in the buffer report trigger frame.

For beneficial effects of the thirteenth aspect, refer to beneficial effects of the twelfth aspect. Details are not described herein again. The method described in the thirteenth aspect may be combined with the method described in the third aspect, the fifth aspect, the eighth aspect, or the eleventh aspect. Alternatively, the method described in the thirteenth aspect may be independently implemented.

According to a fourteenth aspect, this application provides a link allocation method, where the method includes: A station receives a link allocation frame for D2D transmission sent by an access point, where the link allocation frame includes a link identifier for the D2D transmission, a sender identifier for the D2D transmission, and a receiver identifier for the D2D transmission. According to the method described in the fourteenth aspect, the access point may allocate a D2D link to the station. The method described in the fifteenth aspect may be combined with the method described in the first aspect, the third aspect, the fourth aspect, the sixth aspect, the seventh aspect, the ninth aspect, the tenth aspect, or the twelfth aspect. Alternatively, the method described in the fourteenth aspect may be independently implemented.

According to a fifteenth aspect, this application provides a D2D transmission method, where the method includes: An access point sends a link allocation frame for D2D transmission to a station, where the link allocation frame includes a link identifier for the D2D transmission, a sender identifier for the D2D transmission, and a receiver identifier for the D2D transmission. According to the method described in the fifteenth aspect, the access point may allocate a D2D link to the station. The method described in the fifteenth aspect may be combined with the method described in the second aspect, the fifth aspect, the eighth aspect, the eleventh aspect, or the thirteenth aspect. Alternatively, the method described in the fifteenth aspect may be independently implemented.

According to a sixteenth aspect, a communication apparatus is provided. The apparatus may be a station, an apparatus in a station, or an apparatus that can be used together with a station. The communication apparatus may alternatively be a chip system. The communication apparatus may perform the method according to the first aspect, the third aspect, the fourth aspect, the sixth aspect, the seventh aspect, the ninth aspect, the tenth aspect, the twelfth aspect, or the fourteenth aspect. A function of the communication apparatus may be implemented by hardware, or may be implemented by hardware executing corresponding software. The hardware or software includes one or more units corresponding to the foregoing function. The unit may be software and/or hardware. For an operation performed by the communication apparatus and beneficial effects, refer to the method and beneficial effects in the first aspect, the third aspect, the fourth aspect, the sixth aspect, the seventh aspect, the ninth aspect, the tenth aspect, the twelfth aspect, or the fourteenth aspect. Repeated details are not described again.

According to a seventeenth aspect, a communication apparatus is provided. The apparatus may be an access point, an apparatus in an access point, or an apparatus that can be used together with an access point. The communication apparatus may alternatively be a chip system. The communication apparatus may perform the method according to the second aspect, the fifth aspect, the eighth aspect, the eleventh aspect, the thirteenth aspect, or the fifteenth aspect. A function of the communication apparatus may be implemented by hardware, or may be implemented by hardware executing corresponding software. The hardware or software includes one or more units corresponding to the foregoing function. The unit may be software and/or hardware. For an operation performed by the communication apparatus and beneficial effects, refer to the method and beneficial effects in the second aspect, the fifth aspect, the eighth aspect, the eleventh aspect, the thirteenth aspect, or the fifteenth aspect. Repeated details are not described again.

According to an eighteenth aspect, this application provides a communication apparatus, where the communication apparatus includes at least one processor. When the processor invokes a computer program in a memory, the method performed by a station in the method according to the first aspect, the third aspect, the fourth aspect, the sixth aspect, the seventh aspect, the ninth aspect, the tenth aspect, the twelfth aspect, or the fourteenth aspect is performed.

According to a nineteenth aspect, this application provides a communication apparatus, where the communication apparatus includes at least one processor. When the processor invokes a computer program in a memory, a method performed by an access point in the method according to the second aspect, the fifth aspect, the eighth aspect, the eleventh aspect, the thirteenth aspect, or the fifteenth aspect is performed.

According to a twentieth aspect, this application provides a communication apparatus, where the communication apparatus includes a processor and a memory, and the memory is configured to store a computer program. The processor is configured to execute the computer program stored in the memory, so that the communication apparatus performs the method performed by the station in the method according to the first aspect, the third aspect, the fourth aspect, the sixth aspect, the seventh aspect, the ninth aspect, the tenth aspect, the twelfth aspect, or the fourteenth aspect.

According to a twenty-first aspect, this application provides a communication apparatus, where the communication apparatus includes a processor and a memory, and the memory is configured to store a computer program. The processor is configured to execute the computer program stored in the memory, so that the communication apparatus performs the method performed by the access point in the method according to the second aspect, the fifth aspect, the eighth aspect, the eleventh aspect, the thirteenth aspect, or the fifteenth aspect.

According, to a twenty-second aspect, this application provides a communication apparatus, where the communication apparatus includes a processor, a memory, and a transceiver. The transceiver is configured to receive a signal or send a signal. The memory is configured to store a computer program. The processor is configured to invoke the computer program from the memory to perform the method performed by the station in the method according to the first aspect, the third aspect, the fourth aspect, the sixth aspect, the seventh aspect, the ninth aspect, the tenth aspect, the twelfth aspect, or the fourteenth aspect.

According to a twenty-third aspect, this application provides a communication apparatus, where the communication apparatus includes a processor, a memory, and a transceiver. The transceiver is configured to receive a signal or send a signal. The memory is configured to store a computer program. The processor is configured to invoke the computer program from the memory to perform the method performed by the access point in the method according to the second aspect, the fifth aspect, the eighth aspect, the eleventh aspect, the thirteenth aspect, or the fifteenth aspect.

According to a twenty-fourth aspect, this application provides a communication apparatus, where the communication apparatus includes at least one processor and a communication interface. The processor runs a computer program to perform the method performed by the station in the method according to the first aspect, the third aspect, the fourth aspect, the sixth aspect, the seventh aspect, the ninth aspect, the tenth aspect, the twelfth aspect, or the fourteenth aspect.

According to a twenty-fifth aspect, this application provides a communication apparatus, where the communication apparatus includes at least one processor and a communication interface. The communication interface is configured to receive a computer program and transmit the computer program to the processor. The processor runs the computer program to perform the method performed by the access point in the method according to the second aspect, the fifth aspect, the eighth aspect, the eleventh aspect, the thirteenth aspect, or the fifteenth aspect.

According to a twenty-sixth aspect, this application provides a computer-readable storage medium, where the computer-readable storage medium is configured to store instructions. When the instructions are executed, the method performed by the station in the method according to the first aspect, the third aspect, the fourth aspect, the sixth aspect, the seventh aspect, the ninth aspect, the tenth aspect, the twelfth aspect, or the fourteenth aspect is implemented.

According to a twenty-seventh aspect, this application provides a computer-readable storage medium, where the computer-readable storage medium is configured to store instructions. When the instructions are executed, the method performed by the access point in the method according to the second aspect, the fifth aspect, the eighth aspect, the eleventh aspect, the thirteenth aspect, or the fifteenth aspect is implemented.

According to a twenty-eighth aspect, this application provides a computer program product including instructions. When the instructions are executed, the method performed by the station in the method according to the first aspect, the third aspect, the fourth aspect, the sixth aspect, the seventh aspect, the ninth aspect, the tenth aspect, the twelfth aspect, or the fourteenth aspect is implemented.

According to a twenty-ninth aspect, this application provides a computer program product including instructions. When the instructions are executed, the method performed by the access point in the method according to the second aspect, the fifth aspect, the eighth aspect, the eleventh aspect, the thirteenth aspect, or the fifteenth aspect is implemented.

According to a thirtieth aspect, this application provides a communication system, where the communication system includes a station and an access point, and the station may perform the method according to the first aspect, and the access point may perform the method according to the second aspect. Alternatively, the communication system includes the first station that can perform the method according to the third aspect, the second station that can perform the method according to the fourth aspect, and the access point that can perform the method according to the fifth aspect. Alternatively, the communication system includes the first station that can perform the method according to the sixth aspect, the second station that can perform the method according to the seventh aspect, and the access point that can perform the method according to the eighth aspect. Alternatively, the communication system includes the first station that can perform the method according to the ninth aspect, the second station that can perform the method according to the tenth aspect, and the access point that can perform the method according to the eleventh aspect. Alternatively, the communication system includes the first station that can perform the method according to the twelfth aspect and the access point that can perform the method according to the thirteenth aspect. Alternatively, the communication system includes the first station that can perform the method according to the fourteenth aspect and the access point that can perform the method according to the fifteenth aspect.

BRIEF DESCRIPTION OF DRAWINGS

To describe the technical solutions in the embodiments of the present invention more clearly, the following briefly describes the accompanying drawings required for describing the embodiments. It is clearly that the accompanying drawings in the following description show merely some embodiments of the present invention, and a person of ordinary skill in the art may derive other drawings from these accompanying drawings without creative efforts.

DESCRIPTION OF EMBODIMENTS

The following further describes specific embodiments of this application in detail with reference to the accompanying drawings.

To implement D2D transmission in a Wi-Fi system, embodiments of this application provide a device-to-device D2D transmission method and a communication apparatus. The following first describes a system architecture to which the embodiments of this application may be applied.

Figure 1:
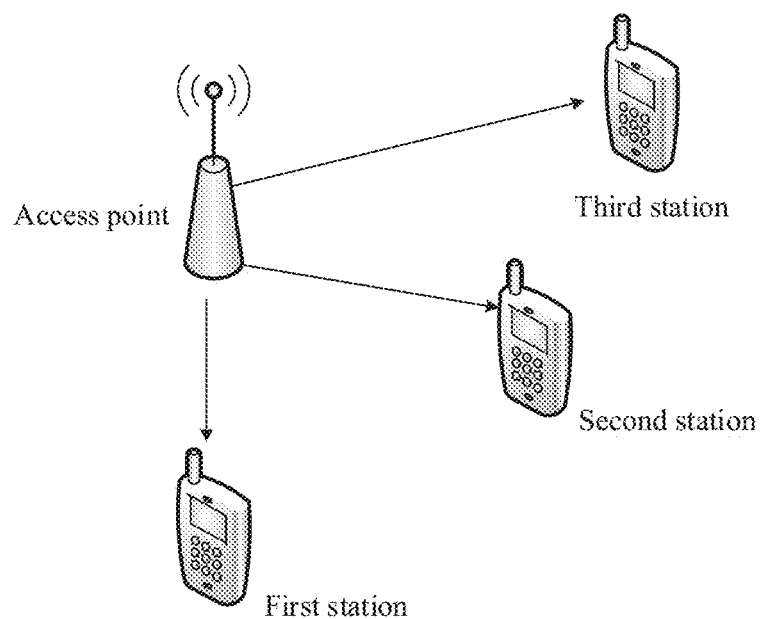
FIG. 1 is a schematic diagram of a system architecture according to an embodiment of this application.

FIG. 1 is a schematic diagram of a system architecture according to an embodiment of this application. As shown in FIG. 1, the system architecture includes an access point (access point, AP) and a plurality of non-access point stations (none access point station, non-AP STA).

For ease of description, the non-access point station is referred to as a station for short in the following. FIG. 1 is described by using an example in which the system architecture includes one access point and three stations. Certainly, the system architecture may further include more access points and stations. Alternatively, the system architecture may include only two stations.

The access point may be an access point used by a terminal device (such as a mobile phone) to access a wired (or wireless) network, and is mainly deployed in a home, a building, or a campus. A typical coverage radius is tens of meters to hundreds of meters. Certainly, the access point may also be deployed outdoors. The access point is equivalent to a bridge that connects the wired network arid the wireless network. A main function of the access point is to connect various wireless network clients together and then connect the wireless network to an Ethernet. Specifically, the access point may be a terminal device (such as a mobile phone) or a network device (such as a router) with a wireless fidelity (wireless fidelity, Wi-Fi) chip. The access point may be a device that supports the 802.11be standard. Alternatively, the access point may be a device that supports a plurality of wireless local area network (wireless local area networks, WLAN) standards, such as 802.11ax, 802.11ac, 802.11n, 802.11g, 802.11b, and 802.11a.

The station may be a wireless communication chip, a wireless sensor, a wireless communication terminal, or the like. For example, the station may be a mobile phone that supports a Wi-Fi communication function, a tablet computer that supports a Wi-Fi communication function, a set top box that supports a Wi-Fi communication function, a smart television that supports a Wi-Fi communication function, a smart wearable device that supports a Wi-Fi communication function, a vehicle-mounted communication device that supports a Wi-Fi communication function, or a computer that supports a Wi-Fi communication function. Optionally, the station may support the 802.11be standard. The station may also support the plurality of wireless local area network (wireless local area networks, WLAN) standards, such as 802.11ax, 802.1.1ac, 802.11n, 802.11g, 802.11b, and 802.11a.

For example, the access point and the station may be a device used in an Internet of Vehicles, an Internet of Things node, a sensor, or the like in an Internet of Things, a smart camera, a smart remote controller, a smart water meter in a smart home, a sensor in a smart city, or the like.

The following further describes the D2D transmission method and the communication apparatus that are provided in this application.

Figure 2:
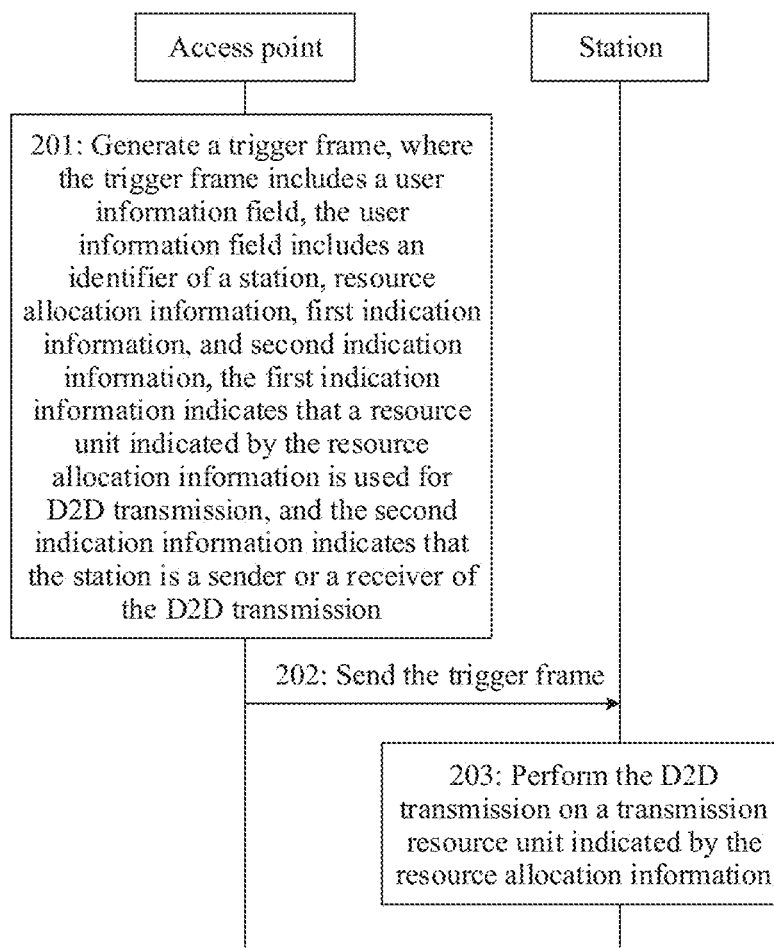
FIG. 2 is a schematic flowchart of a D2D transmission method according to an embodiment of this application.

FIG. 2 is a schematic flowchart of a D2D transmission method according to an embodiment of this application. The D2D transmission method is applicable to a hybrid transmission scenario in which uplink transmission and D2D transmission are combined in a Wi-Fi system. As shown in FIG. 2, the D2D transmission method includes the following step 201 to step 203. The method shown in FIG. 2 may be executed by an access point and a station. Alternatively, the method shown in FIG. 2 may be executed by a chip in an access point and a chip in a station. In FIG. 2, an example in which the access point and the station are entities for executing the method is used for description.

201: The access point generates a trigger frame (trigger frame, TF).

The trigger frame includes a user information (user info) field. The user information field includes an identifier of the station, resource allocation information, first indication information, and second indication information. The first indication information indicates that a resource unit indicated by the resource allocation information is used for D2D transmission. The second indication information indicates that the station is a sender or a receiver of the D2D transmission. Certainly, the trigger frame may further include another field. This is not limited in embodiments of this application. In embodiments of this application, the D2D transmission may also be referred to as tunneled direct link setup (Tunneled Direct Link Setup, TDLS) transmission.

The identifier of the station may also be referred to as an association identifier (Association Identifier, AID) of the station. The identifier of the station may be a MAC address of the station or an identifier generated based on the MAC address of the station.

The resource allocation information is used to allocate the resource unit (resource unit, RU) to the station, and the resource allocation information is located at a resource unit allocation (RU allocation) field in the user information field.

The first indication information may be one or more bits. The first indication information may also be referred to as transmission type indication information. For example, the first indication information is 1 bit, and a bit value of the first indication information may be 1 or 0. When the bit value is 1, it indicates that the resource unit indicated by the resource allocation information is used for the D2D transmission; and when the bit value is 0, it indicates that the resource unit indicated by the resource allocation information is used for the uplink transmission. Alternatively, when the bit value is 0, it indicates that the resource unit indicated by the resource allocation information is used for the D2D transmission; and when the bit value is 1, it indicates that the resource unit indicated by the resource allocation information is used for the uplink transmission. For another example, the first indication information includes 2 bits, and the bit value of the first indication information may be 00 or 11. When the bit value is 00, it indicates that the resource unit indicated by the resource allocation information is used for the D2D transmission; and when the bit value is 11, it indicates that the resource unit indicated by the resource allocation information is used for the uplink transmission. Alternatively, when the bit value is 11, it indicates that the resource unit indicated by the resource allocation information is used for the D2D transmission; and when the bit value is 00, it indicates that the resource unit indicated by the resource allocation information is used for the uplink transmission. Optionally, the first indication information may not indicate that the resource unit indicated by the resource allocation information is used for the uplink transmission.

The second indication information may be one or more bits. The second indication information may also be referred to as transmission role indication information. For example, the second indication information is 1 bit, a bit value of the second indication information is 1 or 0. When the bit value of the second indication information is 1, the station is the sender of the D2D transmission; and when the bit value of the second indication information is 0, the station is the receiver of the D2D transmission. Alternatively, when the bit value of the second indication information is 0, the station is the sender of the D2D transmission, and when the bit value of the second indication information is 1, the station is the receiver of the D2D transmission. For another example, the second indication information includes 2 bits, the bit value of the second indication information is 00 or 11. When the bit value of the second indication information is 00, it indicates that the station is the sender of the D2D transmission; and when the hit value of the second indication information is 11, it indicates that the station is the receiver of the D2D transmission. Alternatively, when the bit value of the second indication information is 11, it indicates that the station is the sender of the D2D transmission; and when the bit value of the second indication information is 00, it indicates that the station is the receiver of the D2D transmission. Optionally, in embodiments of this application, if the first indication information indicates that the resource unit indicated by the resource allocation information is used for the uplink transmission, the trigger frame does not carry the second indication information.

In a possible implementation, the user information field includes 48 bits. After receiving the trigger frame, the station supporting the 802.11ax standard parses only 48 bits of the user information field. If the user information field is set to a value greater than 48 bits, a station that supports the 802.11ax standard cannot properly parse the user information field. Based on this possible implementation, all user information fields are 48 bits. The station that supports 802.11ax can normally parse the trigger frame, and the D2D transmission can be compatible with OFDMA uplink transmission or random access of the station that supports 802.11ax.

In a possible implementation, the first indication information is located at a $40^{th}$ bit (B39) of the user information field. In the user information field in a trigger frame structure of the 802.11ax standard, the $40^{th}$ hit (B39) is a reserved bit. In embodiments of this application, the reserved bit is modified, and the reserved bit is modified to carry the first indication information. In this way, a new bit does not need to be added to the user information field to carry the first indication information, thereby saving bits in the user information field.

In a possible implementation, the second indication information is located at a $46^{th}$ bit (B45) of the user information field. In other words, the second indication information is located at a sixth bit (B5) of a trigger dependent user information field (trigger dependent user info) in the user information field. The $46^{th}$ bit (B45) of the user information field in the trigger frame structure of the 802.11ax standard is the reserved bit. In embodiments of this application, the reserved bit is modified, and the reserved bit is modified to carry the second indication information. In this way, a new bit does not need to be added to the user information field to carry the second indication information, thereby saving bits in the user information field. Optionally, if the first indication information indicates that the resource unit indicated by the resource allocation information is used for the uplink transmission, the $46^{th}$ bit (B45) of the user information field is the reserved bit.

In a possible implementation, the first indication information and the second indication information may alternatively be indicated by one field. In other words, a value of a field indicates that the resource unit indicated by the resource allocation information is used for the D2D transmission, and indicates that the station is the sender or the receiver of the D2D transmission. For example, when the value of the field is a first value, it indicates that the resource unit indicated by the resource allocation information is used for the D2D transmission, and the station is the sender of the D2D transmission. When the value of the field is a second value, it indicates that the resource unit indicated by the resource allocation information is used for the D2D transmission, and the station is the receiver of the D2D transmission. When the value of the field is a third value, it indicates that the resource unit indicated by the resource allocation information is used for the uplink transmission. For example, the first value may be 00, the second value may be 01, and the third value may be 10.

In a possible implementation, the identifier of the station is located at a first bit (B0) to a $12^{th}$ bit (B11) of the user information field.

In a possible implementation, the resource allocation information is located at a $13^{th}$ bit (B12) to a $20^{th}$ bit (B19) of the user information field.

Figure 3:
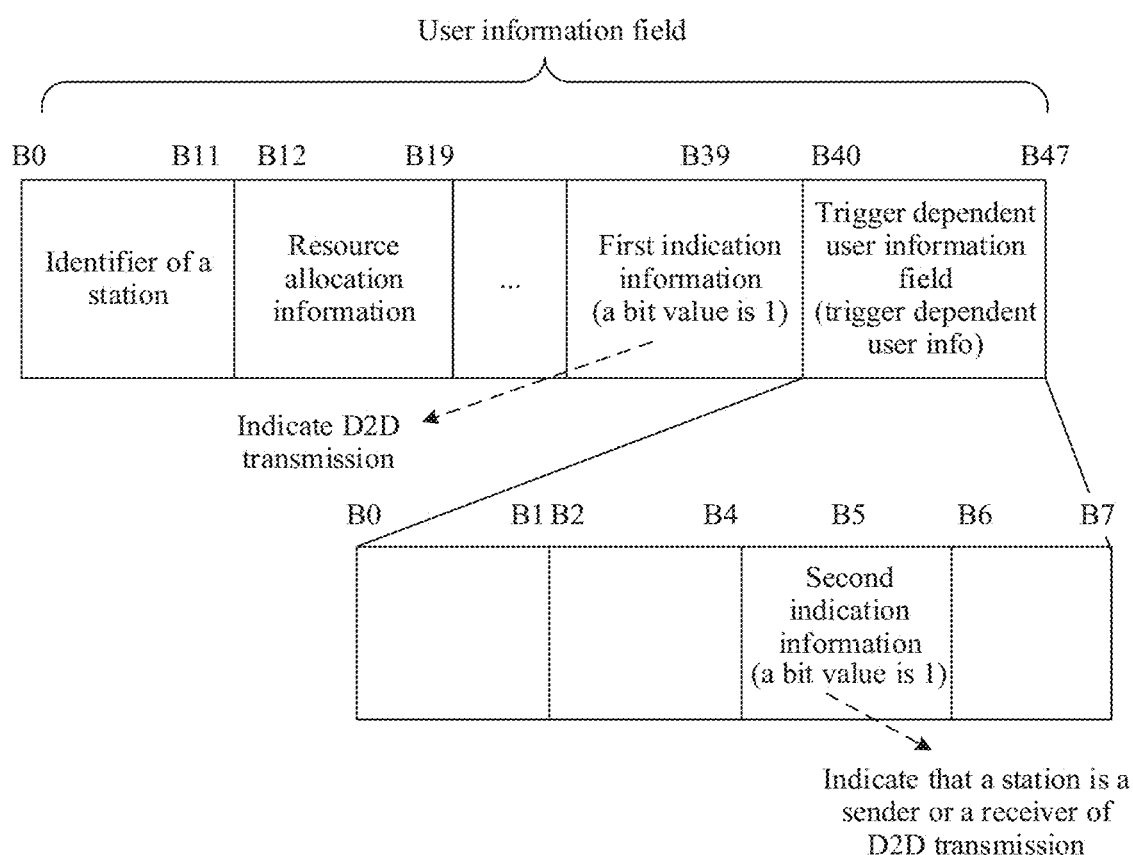
FIG. 3 is a schematic diagram depicting a structure of a trigger frame according to an embodiment of this application.

For example, as shown in FIG. 3, the user information field in the trigger frame includes 48 bits. A first bit (B0) to a $12^{th}$ bit (B11) of the user information field carry the identifier of the station. A $13^{th}$ bit (B12) to a $20^{th}$ bit (B19) of the user information field carry the resource allocation information. A $40^{th}$ bit (B39) of the user information field carries the first indication information. If the bit value of the first indication information is 1, the first indication information indicates that the resource unit allocated by the resource allocation information is used for the D2D transmission. If the bit value of the first indication information is 0, the first indication information indicates that the resource unit allocated by the resource allocation information is used for the uplink transmission. When the bit value of the first indication information is 0, the sixth bit (B5) of a trigger dependent user information field (trigger dependent user info) of the user information field is a reserved bit.

When the bit value of the first indication information is 1, the sixth bit (B5) of the trigger dependent user information field (trigger dependent user info) of the user information field carries the second indication information. FIG. 3 uses an example in which the bit value of the first indication information is 1. If the bit value of the second indication information is 1, the second indication information indicates that the station is the sender of the D2D transmission. If the bit value of the second indication information is 0, the second indication information indicates that the station is the receiver of the D2D transmission.

Figure 4:
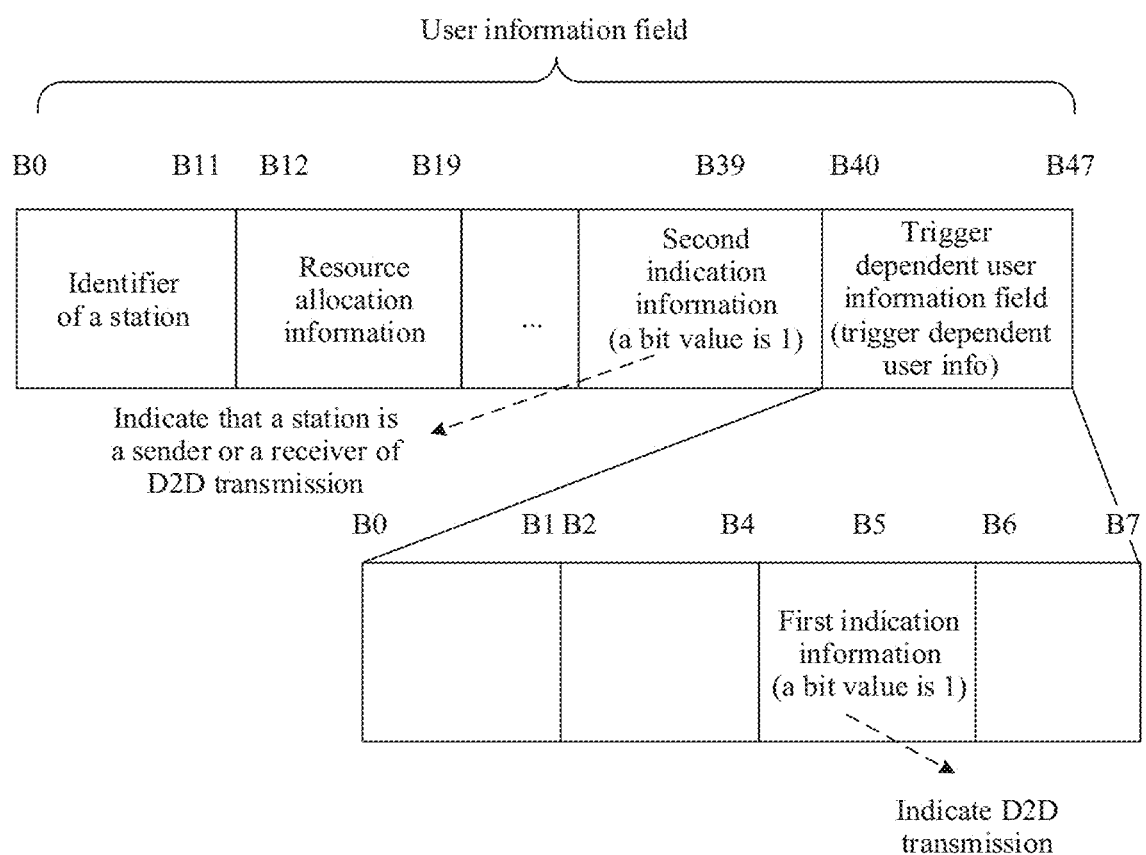
FIG. 4 is a schematic diagram depicting a structure of another trigger frame according to an embodiment of this application.

In a possible implementation, the first indication information is located at the sixth bit (B5) of the trigger dependent user information field (trigger dependent user info) of the user information field. The second indication information is located at the $40^{th}$ bit (B39) of the user information field. In other words, bit location of the first indication information and bit location of the second indication information in FIG. 3 are exchanged. A structure of the trigger frame after exchange is shown in FIG. 4.

Figure 5:
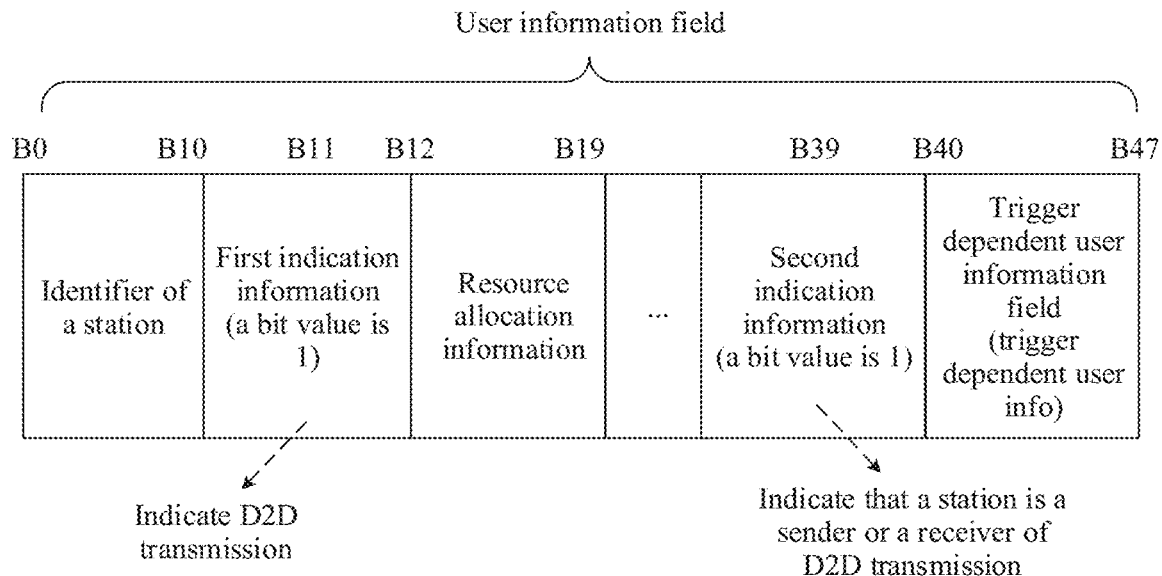
FIG. 5 is a schematic diagram depicting a structure of still another trigger frame according to an embodiment of this application.
Figure 6:
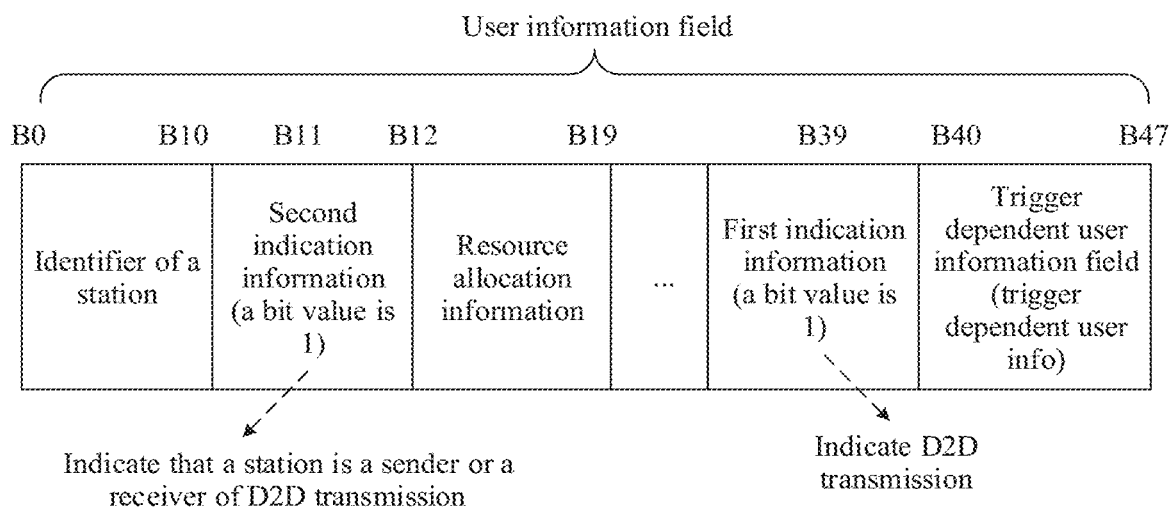
FIG. 6 is a schematic diagram depicting a structure of yet another trigger frame according to an embodiment of this application.

In a possible implementation, the identifier of the station is located at the first bit (B0) to an $11^{th}$ bit (B10) of the user information field. The $12^{th}$ bit (B11) of the user information field may be used to carry other information. For example, as shown in FIG. 5, the first indication information may be located at the $12^{th}$ bit (B11) of the user information field. Alternatively, as shown in FIG. 6, the second indication information may be located at the $12^{th}$ bit (B11) of the user information field.

202: The access point sends the trigger frame.

In embodiments of this application, after generating the trigger frame, the access point may send the trigger frame. For example, the access point may broadcast the trigger frame to a station of the access point.

203: The station performs the D2D transmission on a transmission resource unit indicated by the resource allocation information.

In embodiments of this application, after the station receives the trigger frame sent by the access point, if the station is the sender of the D2D transmission, the station sends data to the receiver of the D2D transmission on the transmission resource unit indicated by the resource allocation information. If the station is the receiver of the D2D transmission, the station receives, on the transmission resource unit indicated by the resource allocation information, data sent by the sender of the D2D transmission.

The following further describes the D2D transmission method provided in this application by using two user information fields as an example.

Figure 7:
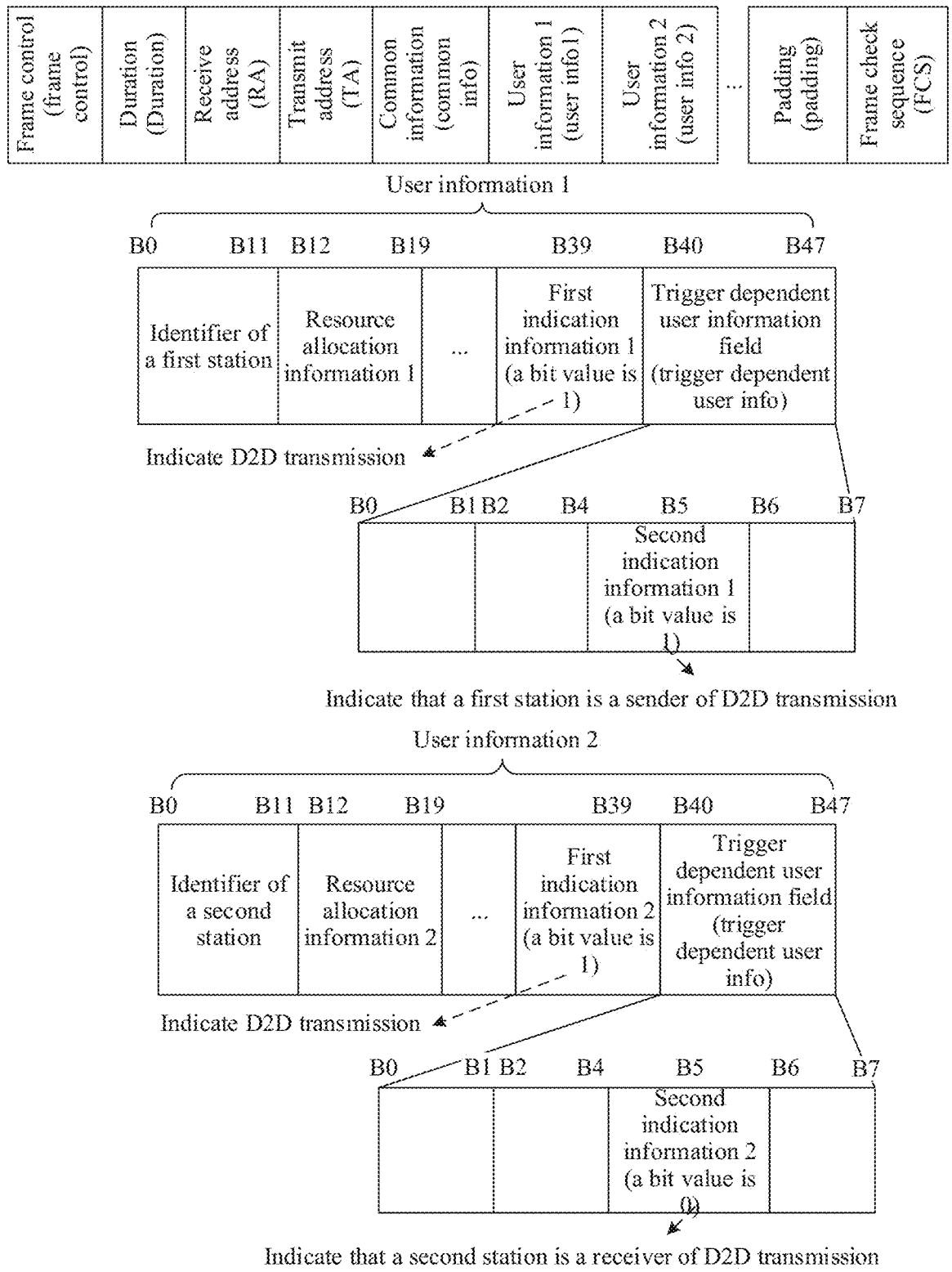
FIG. 7 is a schematic diagram depicting a structure of still yet another trigger frame according to an embodiment of this application.

For example, as shown in FIG. 7, the trigger frame includes a frame control (frame control) field, a duration (duration) field, a receive address (RA) field, a transmit address (TA) field, a common information (common info) field, a plurality of user information (user info) fields, a padding field, and a frame check sequence (FCS) field. The plurality of user information fields include at least a user information 1 (user info1) field and a user information 2 (user info2) field. Alternatively, the trigger frame may include only some fields shown in FIG. 7, or the trigger frame may include more fields than the fields shown in FIG. 7.

As shown in FIG. 7, a user information 1 field includes 48 bits, and a user information 2 field includes 48 bits. A first bit (B0) to a $12^{th}$ bit (B11) of the user information 1 field carry the identifier of the first station. A $13^{th}$ bit (B12) to a $20^{th}$ bit (B19) of the user information 1 field carry resource allocation information 1. A $40^{th}$ bit (B39) of the user information 1 field carries first indication information 1. If a bit value of the first indication information 1 is 1, the first indication information 1 indicates that the resource unit allocated by the first resource allocation information is used for the D2D transmission. If the bit value of the first indication information is 0, the first indication information 1 indicates that the resource unit allocated by the first resource allocation information is used for the uplink transmission. When the bit value of the first indication information is 0, a sixth bit (B5) of trigger dependent user information field (trigger dependent user info) of the user information 1 field is a reserved bit.

When the bit value of the first indication information 1 is 1, the sixth bit (B5) of the trigger dependent user information field (trigger dependent user info) of the user information 1 field carries second indication information 1. If a bit value of the second indication information 1 is 1, the second indication information 1 indicates that the station is the sender of the D2D transmission. If the bit value of the second indication information 1 is 0, the second indication information 1 indicates that the first station is the receiver of the D2D transmission. In FIG. 7, for example, the bit value of the first indication information 1 is 1, and the bit value of the second indication information 1 is 1.

As shown in FIG. 7, a first bit (B0) to a $12^{th}$ bit (B11) of a user information 2 field carry an identifier of a second station. A $13^{th}$ bit (B12) to a $20^{th}$ bit (B19) of the user information 2 field carry resource allocation information 2. A $40^{th}$ bit (B39) of the user information 2 field carries first indication information 2. Similarly, if a bit value of the first indication information 2 is 1, the first indication information 2 indicates that a resource unit allocated by the resource allocation information 2 is used for the D2D transmission. If the bit value of the first indication information 2 is 0, the first indication information 2 indicates that the resource unit allocated by the resource allocation information 2 is used for the uplink transmission. When the bit value of the first indication information 2 is 1, a sixth bit (B5) of a trigger dependent user information field (trigger dependent user info) of the user information 2 field carries second indication information 2. If a bit value of the second indication information 2 is 1, the second indication information 2 indicates that the second station is the sender of the D2D transmission. If the bit value of the second indication information 2 is 0, the second indication information 2 indicates that the second station is the receiver of the D2D transmission. In FIG. 7, for example, the bit value of the first indication information 2 is 1, and the bit value of the second indication information 2 is 0.

The resource unit indicated by the resource allocation information 1 is the same as the resource unit indicated by the resource allocation information 2. Alternatively, the resource unit indicated by the resource allocation information 1 includes, in frequency domain, the resource unit indicated by the resource allocation information 2. After receiving the trigger frame, the first station sends data to the second station on the resource unit indicated by the resource allocation information 1. After receiving the trigger frame, the second station receives, on the resource unit indicated by the resource allocation information 2, the data sent by the first station.

In FIG. 7, functions of the user information 1 and the user information 2 are the same. For ease of distinguishing, user information is numbered and described. The resource allocation information 1 and the resource allocation information 2, the first indication information 1 and the first indication information 2, and the second indication information 1 and the second indication information 2 are similar.

In a possible implementation, user information fields of the first station and the second station are adjacent. In the user information fields of the first station and the second station, only one user information field may have resource allocation information. A station that does not have the resource allocation information in the user information field may parse the resource allocation information from a user information field in another station, to obtain a resource unit used for the D2D transmission. Based on this possible implementation, bits of the user information field can be saved, so that other parameters can be carried by using the saved bits. This helps carry more parameters.

For example, the user information 1 field is adjacent to the user information 2 field, and the user information 1 field precedes the user information 2 field. The user information 1 field carries the identifier of the first station, the resource allocation information 1, the first indication information 1, and the second indication information 1. The user information 2 field carries the identifier of the second station. Optionally, bits in which the resource allocation information 2, the first indication information 2, and the second indication information 2 are located in the user information 2 field may be set to reserved bits, or used to carry another parameter. After receiving the trigger frame, the second station parses information in the trigger frame. After parsing the identifier of the second station in the user information 2 field, the second station parses resource allocation information 1 from the user information 1 field adjacent to the user information 2 field, to determine a D2D transmission resource. Then, the second station receives, on a D2D transmission resource unit, the data sent by the first station. The user information 1 field is similar to the user information 2 field, and details are not described herein again.

In a possible implementation, the trigger frame may further include a user information 3 field, and the user information 3 field is used to allocate, to a third station, a resource unit used for the uplink transmission. After receiving the trigger frame, the third station sends uplink data to the access point on the allocated resource unit used for the uplink transmission. After receiving the uplink data, the access point sends an acknowledgment frame (ACK frame) or a block acknowledgment frame (BA frame) to the third station. If the access point receives the uplink data sent by a plurality of stations, the access point may also send a multi-user block acknowledgment frame (MBA) to the plurality of stations.

In a possible implementation, the first station may further send a BA request frame (ba request, BAR) to the second station. The BA request frame may be sent immediately following a previous frame (for example, at a fixed interval of time, for example, a short inter-frame interval SIFS). The previous frame may be an acknowledgment frame (ACK frame), a block acknowledgment frame (BA frame), or a multi-user block acknowledgment frame (MBA) sent by the access point. The previous frame may further be a data frame sent by the third station. After receiving the BA request frame, the second station sends the BA frame to the first station.

In embodiments of this application, one D2D link can be completely indicated by two user information fields, without additional signaling overheads. An implementation is simple, and in a same trigger frame, a station supporting 802.11ax may be further scheduled to perform OFDMA uplink transmission or random access. Backward compatibility is achieved.

The following describes several possible implementations in which the second station replies the BA frame.

Figure 8:
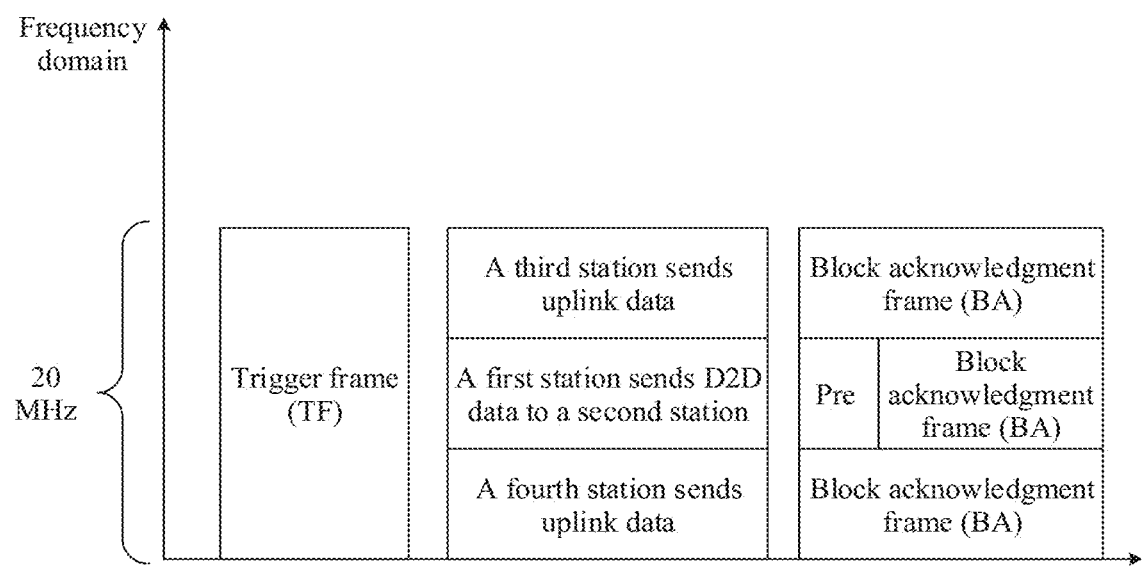
FIG. 8 is a schematic diagram of replying a BA frame by a second station according to an embodiment of this application.

Manner 1: As shown in FIG. 8, the access point and the second station simultaneously reply the BA frame. According to an existing specification of IEEE 802.11ax, the access point separately replies, at an RU level, the BA to each station for the uplink transmission. In other words, the access point receives data of a station on any RU, and replies the BA to the station on this RU. FIG. 8 uses an example in which stations for the uplink transmission are the third station and a fourth station. The second station replies the BA frame on an RU that receives D2D data. A PPDU carrying a D2D BA frame is transmitted only on the RU used by the second station to receive the D2D data, and a preamble of the PPDU does not occupy 20 MHz, but occupies only the RU used by the second station to receive the D2D data.

Figure 9:
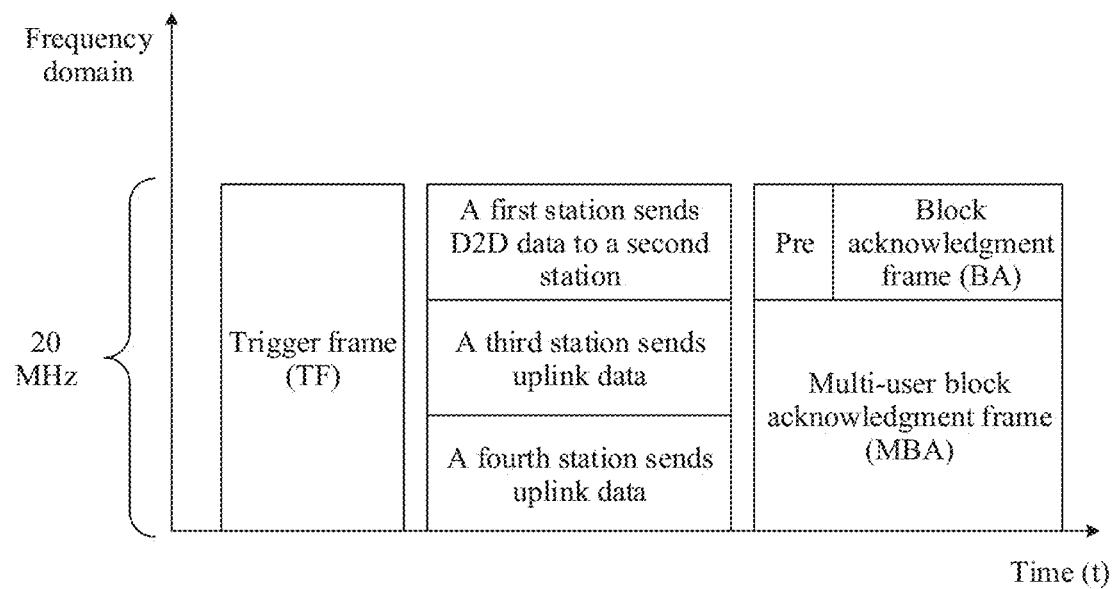
FIG. 9 is another schematic diagram of replying a BA frame by a second station according to an embodiment of this application.

Manner 2: As shown in FIG. 9, the access point and the second station simultaneously reply the BA frame. The access point replies the MBA at a higher bandwidth for a plurality of stations for the uplink transmission. FIG. 9 uses an example in which the stations fix the uplink transmission are the third station and the fourth station. In Manner 2, a specific implementation in which the second station replies the BA frame is the same as a specific implementation in which the second station replies the BA frame in Manner 1, and details are not described herein again.

Figure 10:
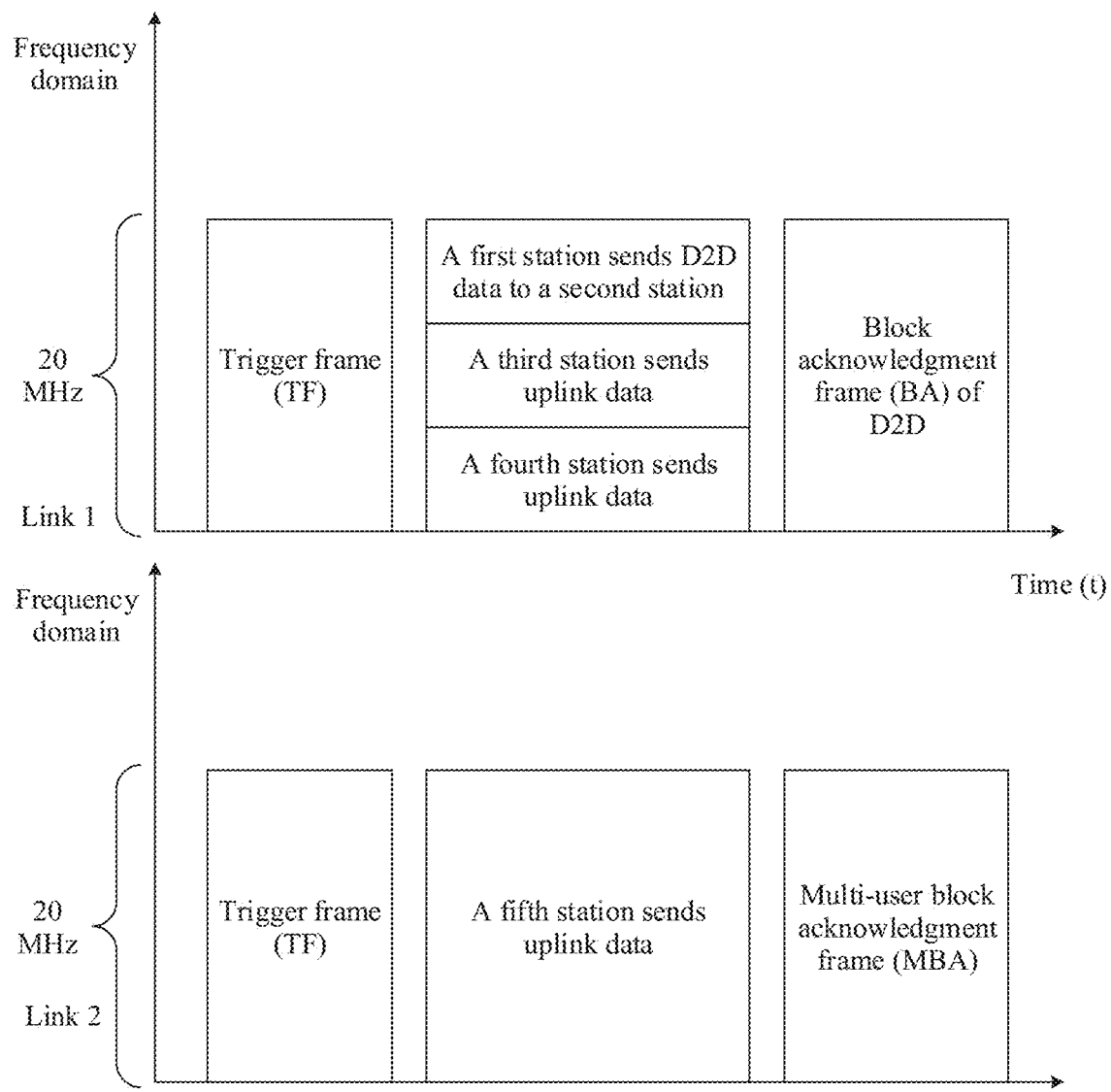
FIG. 10 is still another schematic diagram of replying a BA frame by a second station according to an embodiment of this application.

Manner 3: As shown in FIG. 10, the access point and the second station simultaneously reply the BA frame. This method is applicable to the introduced multi-link technology (Multi-link). After completing receiving the D2D data, the second station directly replies the BA frame on the entire 20 MHz after waiting for the SIFS. The access point returns MBAs of a plurality of links on another non-D2D transmission link.

Based on the foregoing implementations in which the second station replies the BA frame described in Manner 1 to Manner 3, interference is avoided between the BA frame replied by the access point and the BA frame replied by the second station. The foregoing three manners of replying the BA frame by the second station may also be used independently and are not combined with the foregoing solution.

It can be learned that, According to the method described in FIG. 2, the access point can allocate a D2D transmission resource unit to the first station and the second station, so that the first station and the second station can implement the D2D transmission in a Wi-Fi system.

In the method embodiment described in FIG. 2, a first frame structure of the trigger frame is described. Embodiments of this application further provides another D2D transmission method and frame structures of another two trigger frames.

Figure 11:
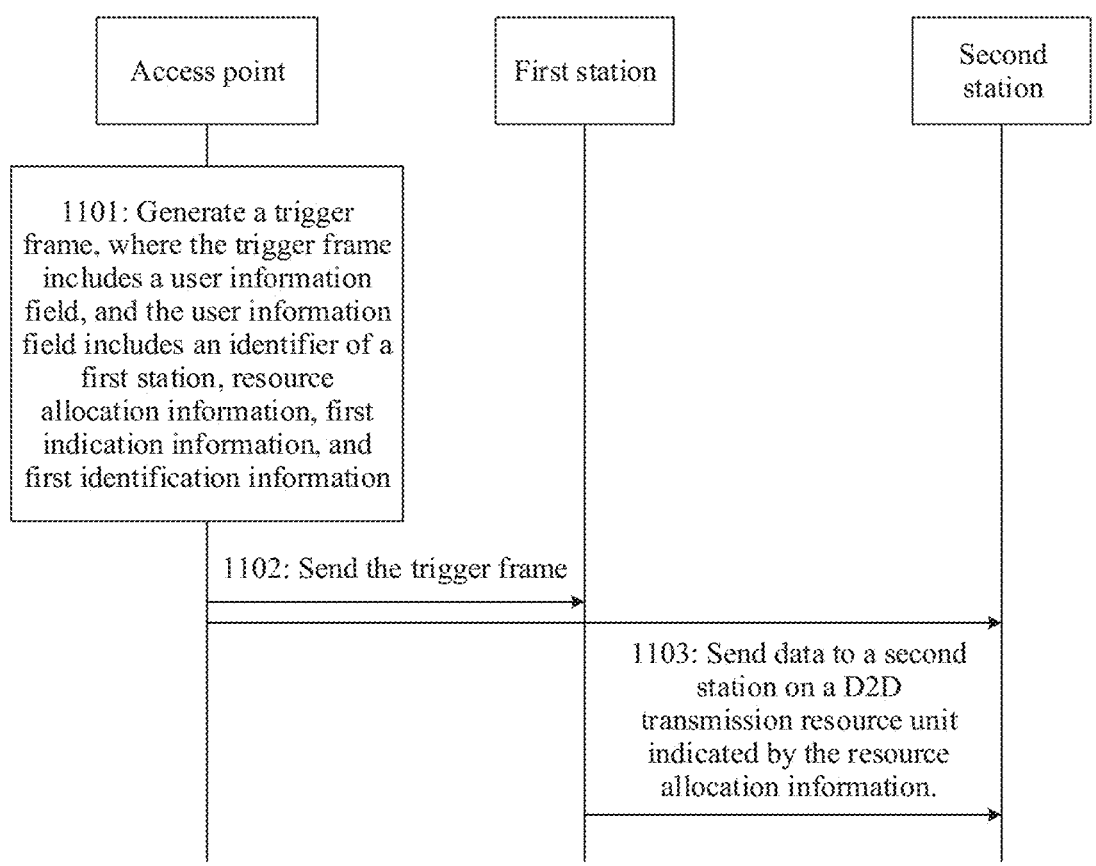
FIG. 11 is a schematic flowchart of another D2D transmission method according to an embodiment of this application.

FIG. 11 is a schematic flowchart of a D2D transmission method according to an embodiment of this application. As shown in FIG. 11, the D2D transmission method includes the following step 1101 to step 1103. The method shown in FIG. 11 may be executed by an access point and a station. Alternatively, the method shown in FIG. 11 may be executed by a chip in an access point and a chip in a station. In FIG. 11, an example in which the access point and the station are entities for executing the method is used for description.

1101: An access point generates a trigger frame.

The trigger frame includes a user information field, and the user information field includes an identifier of the first station, resource allocation information, first indication information, and first identification information. The first station is a sender of D2D transmission. The first indication information indicates that a resource unit indicated by the resource allocation information is used for the D2D transmission. The first identification information is an identifier of a second station. The second station is a receiver of the D2D transmission, or the first identification information is a link identifier for the D2D transmission.

For related descriptions of the identifier of the first station and the first indication information, refer to related descriptions in the foregoing embodiments. Details are not described herein again. The resource allocation information is used to allocate the resource unit for the D2D transmission, and the resource allocation information is located at a resource unit allocation field (RU allocation field) of the user information field.

In a possible implementation, the first identification information may be a partial identifier or a complete identifier of the second station.

In a possible implementation, the user information field in the trigger frame includes 48 bits. This possible implementation can improve system compatibility.

In a possible implementation, the first indication information is located at a $40^{th}$ bit (B39) of the user information field; or the first indication information is located at a $12^{th}$ bit (B11) of the user information field; or the first indication information is located at a $46^{th}$ bit (B45) of the user information field. In other words, the first indication information is located at a sixth hit (B5) of a trigger dependent user information field (trigger dependent user info) in the first user information field. Based on this possible implementation, bits of the user information field are reduced.

In a possible implementation, the first identification information is located at a $33^{rd}$ bit (B32) to a $39^{th}$ bit (B38) of the user information field. During the D2D transmission, a UL Target RSSI subfield (B32 to B38) of the user information field may be reused to carry the first identification information. When the first indication information indicates that the resource unit indicated by the resource allocation information is used for the D2D transmission, the $33^{rd}$ bit (B32) to the $39^{th}$ bit (B38) carry the first identification information.

When the first indication information indicates that the resource unit indicated by the resource allocation information is used for uplink transmission, the 33$^{rd}$ bit (B32) to the 39$^{th}$ bit (B38) of the user information field are the UL Target RSSI field. Based on this possible implementation, bits of the user information field are reduced.

In a possible implementation, the identifier of the first station is located at a first bit (B0) to the 12$^{th}$ bit (B11) of the user information field. Alternatively, the identifier of the first station is located at the first bit (B0) to an 11$^{th}$ bit (B10) of the user information field.

In a possible implementation, the resource allocation information is located at a 13$^{th}$ bit (B12) to a 20$^{th}$ bit (B19) of the user information field.

Figure 12:
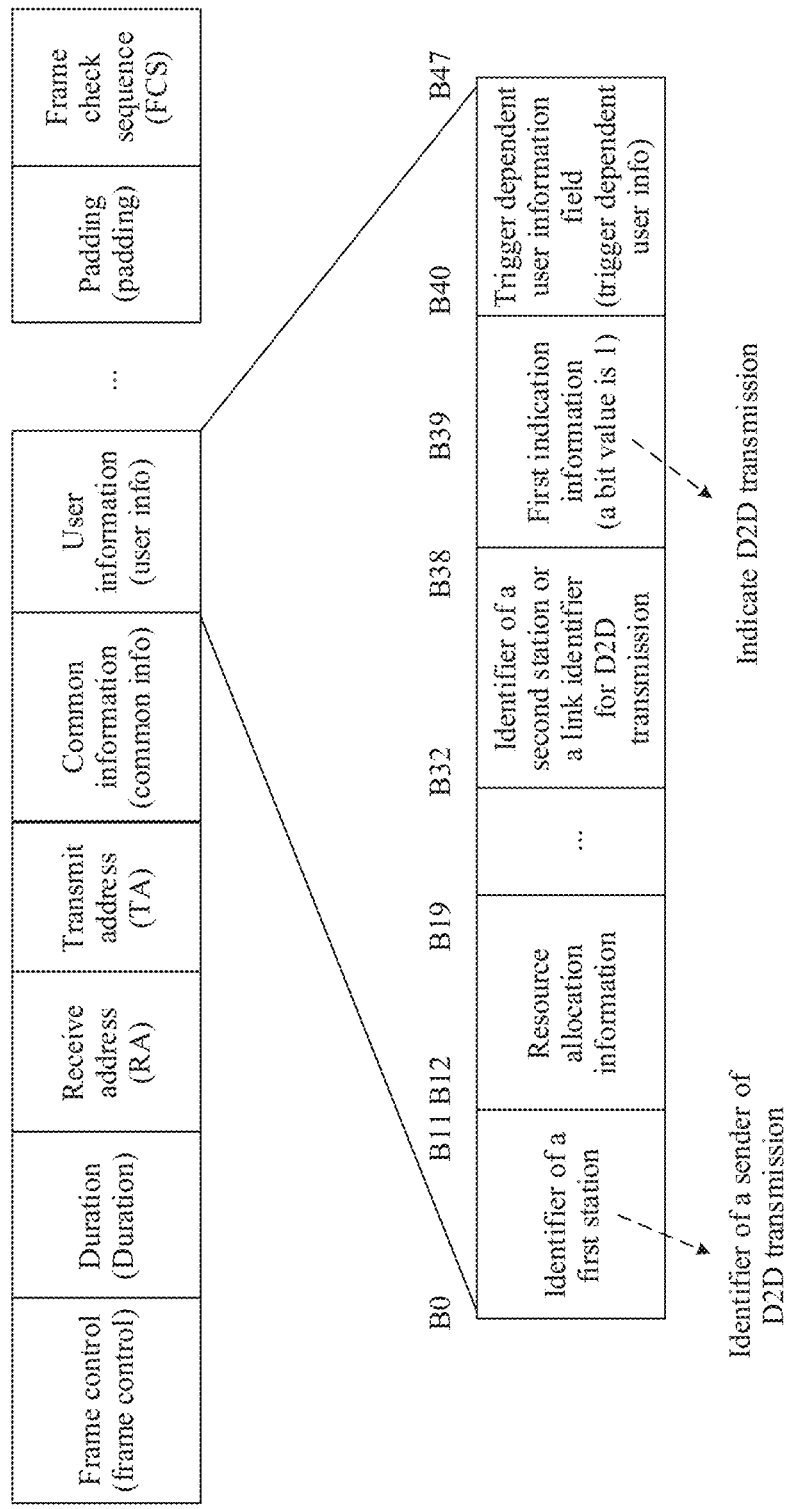
FIG. 12 is a schematic diagram depicting a structure of a further trigger frame according to an embodiment of this application.

For example, as shown in FIG. 12, the trigger frame includes a frame control (frame control) field, a duration (duration) field, a receive address (RA) field, a transmit address (TA) field, a common information (common info) field, a plurality of user information (user info) fields, a padding field, and a frame check sequence (FCS) field. Alternatively, the trigger frame may include only some fields shown in FIG. 12, or the trigger frame may include more fields than the fields shown in FIG. 12.

As shown in FIG. 12, the user information field includes 48 bits. The 13$^{th}$ bit (B12) to the 20$^{th}$ bit (B19) of the user information field carry the resource allocation information. The 40$^{th}$ bit (B39) of the user information field carries the first indication information. If the bit value of the first indication information is 1, the first indication information indicates that the resource unit indicated by the resource allocation information is used for the D2D transmission. If the bit value of the first indication information is 0, the first indication information indicates that the resource unit indicated by the resource allocation information is used the D2D transmission. If the bit value of the first indication information is 0, the 33$^{rd}$ bit (B32) to the 39$^{th}$ bit (B38) of the user information field are the UL Target RSSI field.

If the bit value of the first indication information is 1, the 33$^{rd}$ bit (B32) to the 39$^{th}$ bit (B38) of the user information field carry the first identification information. The first identification information is the identifier of the second station or the link identifier for the D2D transmission. In addition, the first bit (B0) to the 12$^{th}$ bit (B11) of the user information field carry an identifier of the sender of the D2D transmission. The first station is the sender of the D2D transmission. Therefore, if the bit value of the first indication information is 1, the first bit (B0) to the 12$^{th}$ bit (B11) of the user information field carry the identifier of the first station. FIG. 12 uses an example in which the bit value of the first indication information is 1.

Figure 13:
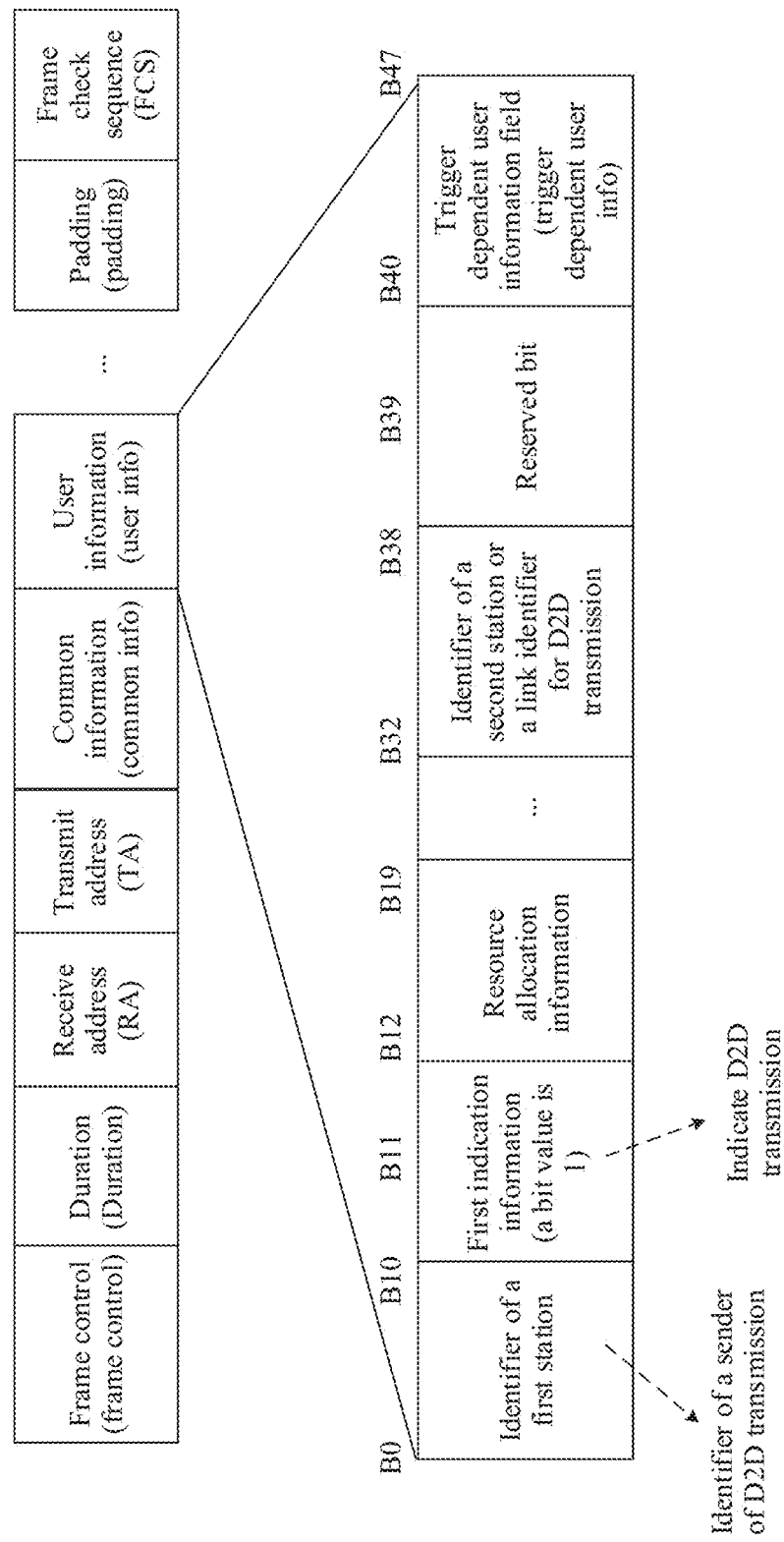
FIG. 13 is a schematic diagram depicting a structure of a still further trigger frame according to an embodiment of this application.

Alternatively, as shown in FIG. 13, the first indication information may be located at the 12$^{th}$ bit (B11) of the user information field, and the first bit (B0) to the 11$^{th}$ bit (B10) of the user information field carry the identifier of the sender of the D2D transmission.

Figure 14:
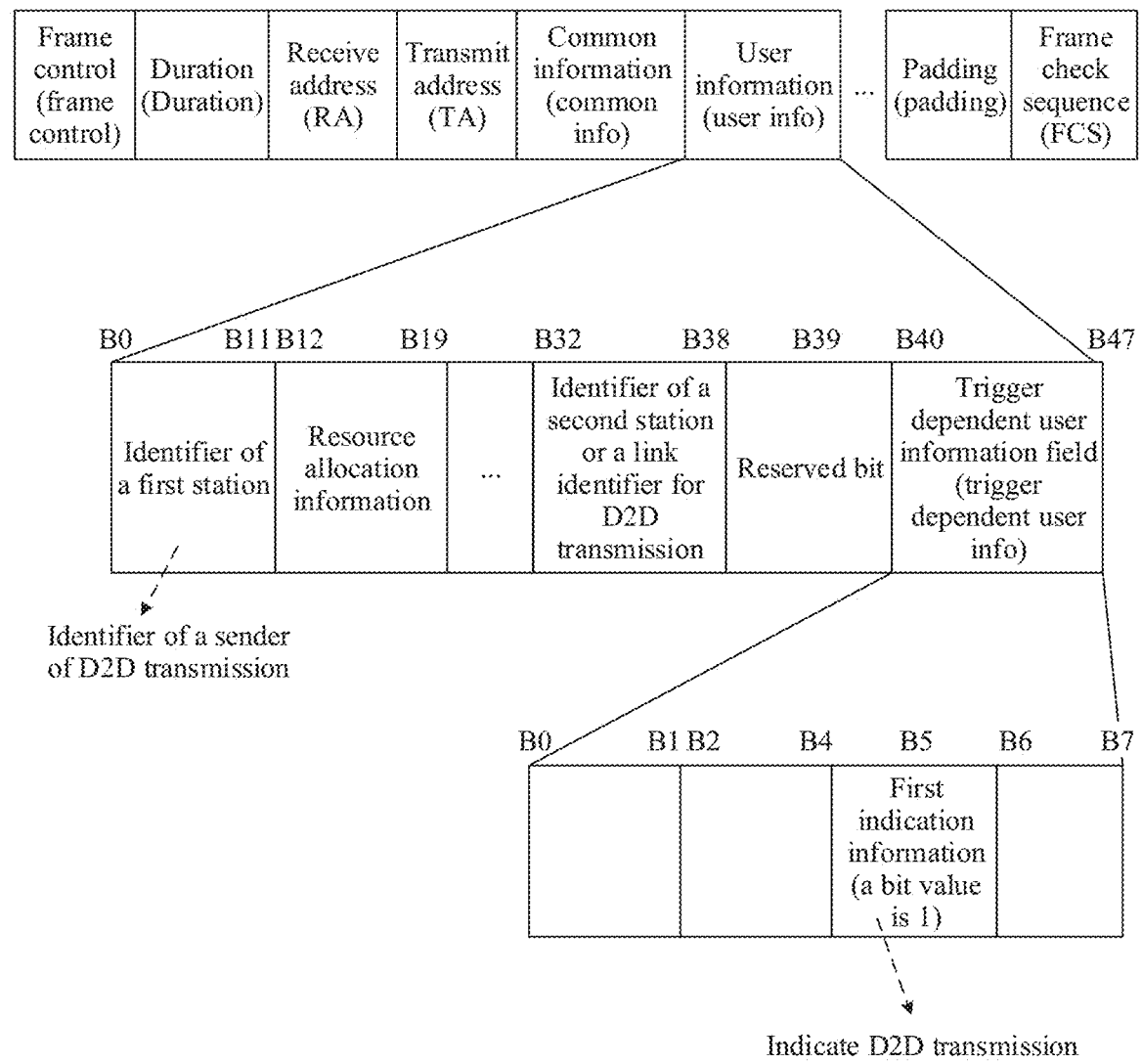
FIG. 14 is a schematic diagram depicting a structure of a yet further trigger frame according to an embodiment of this application.

Alternatively, as shown in FIG. 14, the first indication information may be located at the 46$^{th}$ bit (B5) of the user information field. In other words, the first indication information is located at a sixth bit (B5) of a trigger type dependent user information field (trigger dependent user info) in the first user information field.

1102: The access point sends the trigger frame.

In embodiments of this application, the access point sends the trigger frame after generating the trigger frame. For example, the access point may broadcast the trigger frame to a station of the access point.

1103: The first station sends data to the second station on a D2D transmission resource unit indicated by the resource allocation information.

In embodiments of this application, if the first identification information is the link identifier for the D2D transmission, after receiving the trigger frame, the first station parses the user information field in the trigger frame to obtain the link identifier for the D2D transmission. The first station determines that the second station is the receiver based on the link identifier for the D2D transmission, and sends data to the second station on the D2D transmission resource unit indicated by the resource allocation information. Optionally, a specific implementation in which the first station determines that the second station is the receiver based on the link identifier for the D2D transmission is: The first station determines, based on a prestored correspondence between the link identifier for the D2D transmission and a receiver identifier for the D2D transmission, and the receiver identifier of D2D transmission, that the second station is the receiver of the D2D transmission. Similarly, after receiving the trigger frame, the second station parses the user information field in the trigger frame to obtain the link identifier for the D2D transmission, and determines that the second station is the receiver of the D2D transmission based on the link identifier for the D2D transmission. The second station receives, on the D2D transmission resource allocated by the resource allocation information, the data sent by the first station.

For example, the first station and the second station store a correspondence shown in Table 1. For example, the user information field in the trigger frame carries a link identifier 1 of the D2D transmission. After the first station receives the trigger frame, the first station determines that the second station is the receiver of the D2D transmission based on the correspondence shown in Table 1. The first station sends the data to the second station on the D2D transmission resource unit allocated by the resource allocation information. After the second station receives the trigger frame, the second station determines that the second station is the receiver of the D2D transmission based on the correspondence shown in Table 1. The second station receives, on the D2D transmission resource unit allocated by the resource allocation information, the data sent by the first station.

TABLE 1

| Link identifier for D2D transmission | Sender identifier of a D2D transmission link | Receiver identifier of a D2D transmission link |
| --- | --- | --- |
| Link identifier 1 for D2D transmission | Identifier of a first station | Identifier of a second station |
| Link identifier 2 for D2D transmission | Identifier of a first station | Identifier of a third station |

If the first identification information is a partial identifier of the second station, the first station determines a station whose identification information includes the first identification information as the second station, and sends data to the second station on the D2D transmission resource unit indicated by the resource allocation information. For example, a station identifier stored in the first station includes 111111111111 of a station 1, 000000000000 of a station 2, and 110110110110 of a station 3. If the first identification information is 1111111, the first station sends data to the station 1 on the D2D transmission resource unit indicated by the resource allocation information.

In a possible implementation, the trigger frame may further include a third user information field, and the third user information field is used to allocate, to the third station, a resource unit used for the uplink transmission. After receiving the trigger frame, the third station sends uplink data to the access point on the allocated resource unit used for the uplink transmission. After receiving the uplink data, the access point sends an acknowledgment frame (ACK frame) or a block acknowledgment frame (BA frame) to the third station. If the access point receives the uplink data sent by a plurality of stations, the access point may also send a multi-user block acknowledgment frame (MBA) to the plurality of stations.

In a possible implementation, the first station sends a BA request frame (ba request, BAR) to the second station. The BA request frame may be sent immediately following a previous frame (for example, at a fixed interval of time, for example, a short inter-frame interval SIFS). The previous frame may be an acknowledgment frame (ACK frame), a block acknowledgment frame (BA frame), or a multi-user block acknowledgment frame (MBA) sent by the access point. The previous frame may further be a data frame sent by the third station. After receiving the BA request frame, the second station sends the BA frame to the first station. For three possible implementations in which the first station replies the BA frame, refer to descriptions in the foregoing method embodiments. Details are not described herein again.

In embodiments of this application, one D2D link can be completely indicated by one user information field, without additional signaling overheads. An implementation is simple, and in a same trigger frame, a station supporting 802.11ax may be further scheduled to perform OFDMA uplink transmission or random access. Backward compatibility is achieved.

It can be learned that, According to the method described in FIG. 11, the access point can allocate a D2D transmission resource unit to the first station and the second station, so that the first station and the second station can implement the D2D transmission in a Wi-Fi system.

The following describes a third frame structure of the trigger frame.

Figure 15:
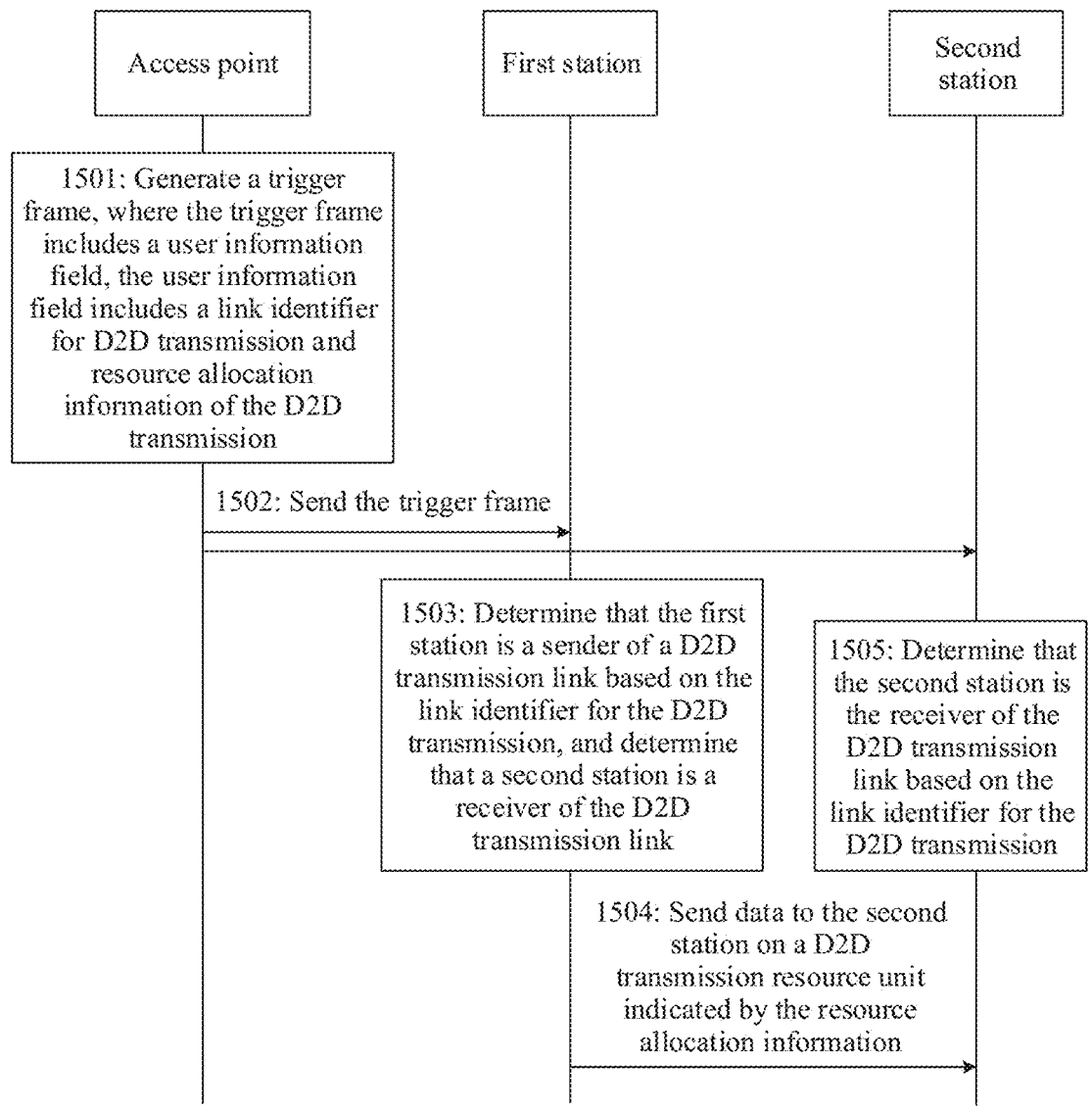
FIG. 15 is a schematic flowchart of still another D2D transmission method according to an embodiment of this application.

FIG. 15 is a schematic flowchart of a D2D transmission method according to an embodiment of this application. As shown in FIG. 15, the D2D transmission method includes the following step 1501 to step 1505. The method shown in FIG. 15 may be executed by an access point and a station. Alternatively, the method shown in FIG. 15 may be executed by a chip in an access point and a chip in a station. FIG. 15 uses an example in which an access point and a station are entities for executing the method.

1501: An access point generates a trigger frame.

A user information field in the trigger frame includes a link identifier for D2D transmission and resource allocation information of the D2D transmission. A link identifier for the D2D transmission may also be referred to as a link association identifier (AID) of the D2D transmission.

In a possible implementation, the user information field in the trigger frame includes 48 bits. This possible implementation can improve system compatibility In a possible implementation, the link identifier for the D2D transmission is located at a first bit (B0) to a $12^{th}$ bit (B11) of the user information field. Based on this possible implementation, the link identifier for the D2D transmission can reuse a first bit (B0) to a $12^{th}$ bit (B11) of the user information field with the association identifier (AID). This helps save bits of the user information field.

In a possible implementation, when the link identifier for the D2D transmission is located at the first bit (B0) to the $12^{th}$ bit (B11) of the user information field, the link identifier for the D2D transmission is different from an identifier of any station of the access point. This helps prevent the station from interpreting the link identifier for the D2D transmission as an identifier of the station.

Figure 16:
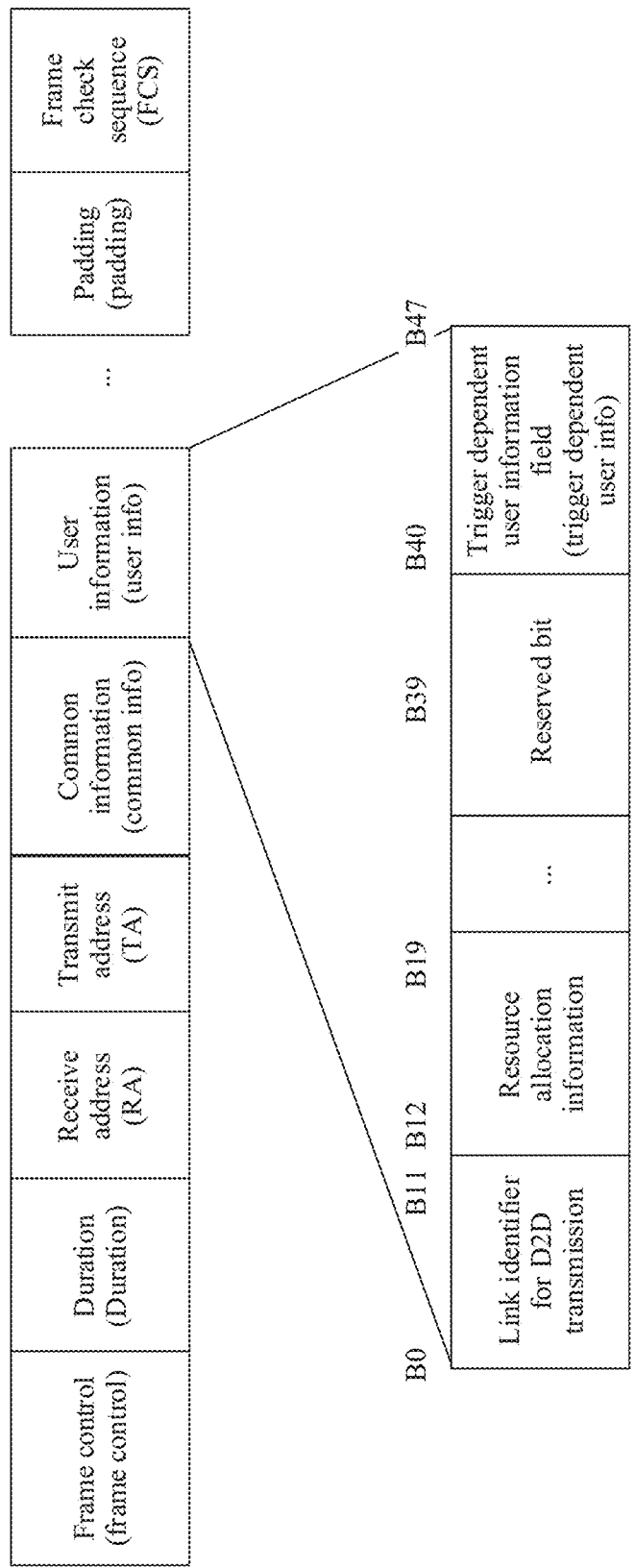
FIG. 16 is a schematic diagram depicting a structure of a still yet further trigger frame according to an embodiment of this application.

For example, as shown in FIG. 16, the trigger frame includes a frame control (frame control) field, a duration (duration) field, a receive address (RA) field, a transmit address (TA) field, a common information (common info) field, a plurality of user information (user info) fields, a padding field, and a frame check sequence (FCS) field. Alternatively, the trigger frame may include only some fields shown in FIG. 16, or the trigger frame may include more fields than the fields shown in FIG. 16.

As shown in FIG. 16, the user information field includes 48 bits. The link identifier for the D2D transmission is located at the first bit (B0) to the $12^{th}$ bit (B11) of the user information field. A thirteenth bit (B12) to a twentieth bit (B19) of the user information field carry the resource allocation information of the D2D transmission. Alternatively, the link identifier for the D2D transmission may be located at the first bit (B0) to the $11^{th}$ bit (B10) of the user information field, and the $12^{th}$ bit of the user information field may be used to carry another parameter.

In a possible implementation, the user information field further includes first indication information, and the first indication information indicates a resource allocated by the resource allocation information is used for the D2D transmission. This possible implementation facilitates the station to distinguish whether the resource unit allocated at the user information field is used for the D2D transmission or uplink transmission.

In a possible implementation, the first indication information may be located at the first bit (B0) to the $12^{th}$ bit (B11) of the user information field. Based on this possible implementation, the first indication information can reuse the first bit (B0) to the $12^{th}$ bit (B11) of the user information field with the association identifier (AID). This helps save bits of the user information field.

In a possible implementation, when the first indication information may be in the first bit (B0) to the $12^{th}$ bit (B11) of the user information field, the link identifier for the D2D transmission is located at a $33^{rd}$ bit (B32) to a $39^{th}$ bit (B38) of the user information field, or the link identifier for the D2D transmission is located at the $33^{rd}$ bit (B32) to a $40^{th}$ bit (B39) of the user information field. Based on this possible implementation, during the D2D transmission, a UL Target RSSI subfield (B32 to B38) of the user information field may be reused to carry the link identifier for the D2D transmission. This helps save bits of the user information field. Optionally, when the first indication information indicates that the resource allocated by the resource allocation information is used for the D2D transmission, a value of the first indication information may be any one of 2008 to 2044 and 2047 to 4094.

Figure 17:
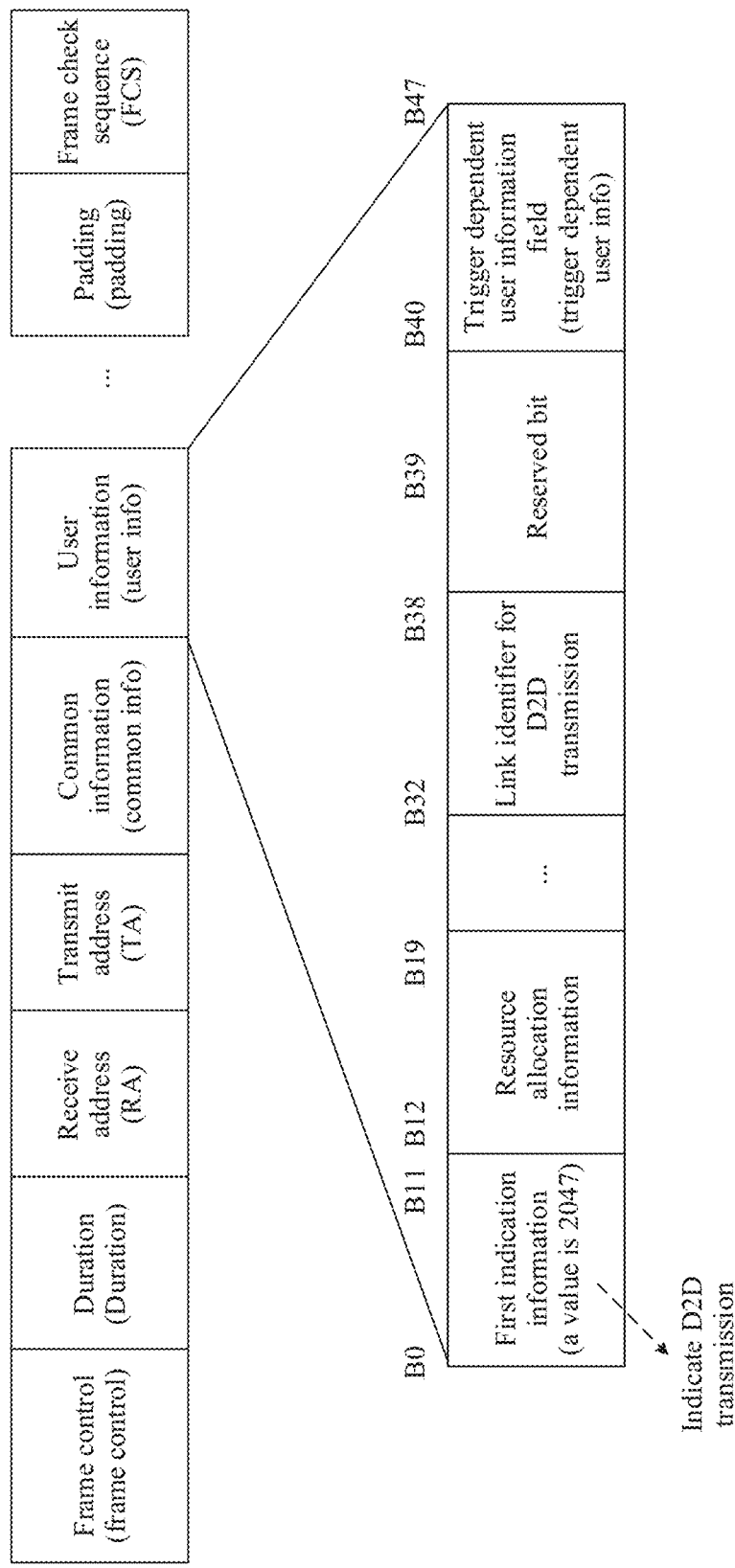
FIG. 17 is a schematic diagram depicting a structure of even yet another trigger frame according to an embodiment of this application.
Figure 18:
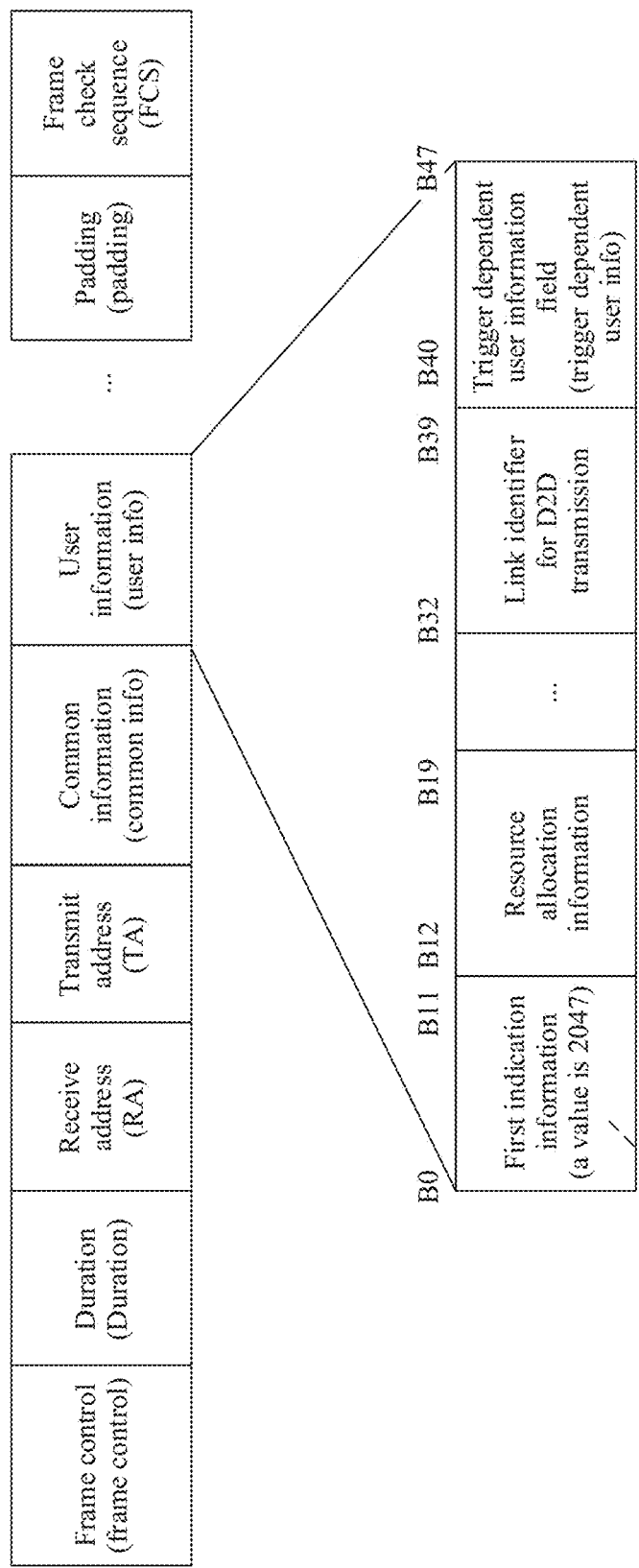
FIG. 18 is a schematic diagram depicting a structure of further another trigger frame according to an embodiment of this application.

For example, as shown in FIG. 17, the user information field includes 48 bits. The first indication information is located at the first bit (B0) to the $12^{th}$ bit (B11) of the user information field. The value of the first indication information is 2047, and the first indication information indicates that the resource unit indicated by the resource allocation information is used for the D2D transmission. A thirteenth bit (B12) to a twentieth bit (B19) of the user information field carry the resource allocation information of the D2D transmission. The $33^{rd}$ bit (B32) to the $39^{th}$ bit (B38) of the user information field carry the link identifier for the D2D transmission. Alternatively, as shown in FIG. 18, the $33^{rd}$ bit (B32) to the 40$^{th}$ bit (B39) of the user information field carry the link identifier for the D2D transmission. When the value of the first indication information is not 2047, the first indication information indicates the identifier of the station, the 33$^{rd}$ bit (B32) to the 39$^{th}$ bit (B38) are the UL Target RSSI field, and the 40$^{th}$ bit (B39) of the user information field is reserved. FIG. 17 and FIG. 18 use an example in which the value of the first indication information is 2047.

1502: The access point sends the trigger frame.

1503: The first station determines that a first station is a sender of a D2D transmission link based on the link identifier for the D2D transmission, and determines that a second station is a receiver of the D2D transmission link.

In embodiments of this application, after receiving the trigger frame, the first station parses the user information field in the trigger frame to obtain the link identifier for the D2D transmission. The first station determines that the first station is the sender of the D2D transmission link based on a prestored correspondence between the link identifier for the D2D transmission and a receiver identifier for the D2D transmission, and the receiver of the D2D transmission, and determines that the second station is the receiver of the D2D transmission link.

1504: The first station sends data to the second station on a D2D transmission resource unit indicated by the resource allocation information.

After determining that the first station is the sender of the D2D transmission link and determining that the second station is the receiver of the D2D transmission link, the first station sends data to the second station on the D2D transmission resource unit indicated by the resource allocation information.

1505: The second station determines that the second station is the receiver of the D2D transmission link based on the link identifier for the D2D transmission.

In embodiments of this application, after receiving the trigger frame, the second station parses the user information field in the trigger frame to obtain the link identifier for the D2D transmission. The second station determines that the second station is the receiver of the D2D transmission based on the prestored correspondence between the link identifier for the D2D transmission and the receiver identifier for the D2D transmission, and the receiver identifier for the D2D transmission. The second station receives, on the D2D transmission resource allocated by the resource allocation information, the data sent by the first station.

In a possible implementation, the trigger frame may further include a third user information field, and the third user information field is used to allocate, to the third station, a resource unit used for the uplink transmission. After receiving the trigger frame, the third station sends uplink data to the access point on the allocated resource unit used for the uplink transmission. After receiving the uplink data, the access point sends an acknowledgment frame (ACK frame) or a block acknowledgment frame (BA frame) to the third station. If the access point receives the uplink data sent by a plurality of stations, the access point may also send a multi-user block acknowledgment frame (MBA) to the plurality of stations.

In a possible implementation, the first station sends a BA request frame (ba request, BAR) to the second station. The BA request frame may be sent immediately following a previous frame (for example, at a fixed interval of time, for example, a short inter-frame interval SIFS). The previous frame may be an acknowledgment frame (ACK frame), a block acknowledgment frame (BA frame), or a multi-user block acknowledgment frame (MBA) sent by the access point. The previous frame may further be a data frame sent by the third station. After receiving the BA request frame, the second station sends the BA frame to the first station. For three possible implementations in which the first station replies the BA frame, refer to descriptions in the foregoing method embodiments. Details are not described herein again.

It can be learned that, According to the method described in FIG. 15, the access point can allocate a D2D transmission resource unit to the first station and the second station, so that the first station and the second station can implement the D2D transmission in a Wi-Fi system.

Figure 19:
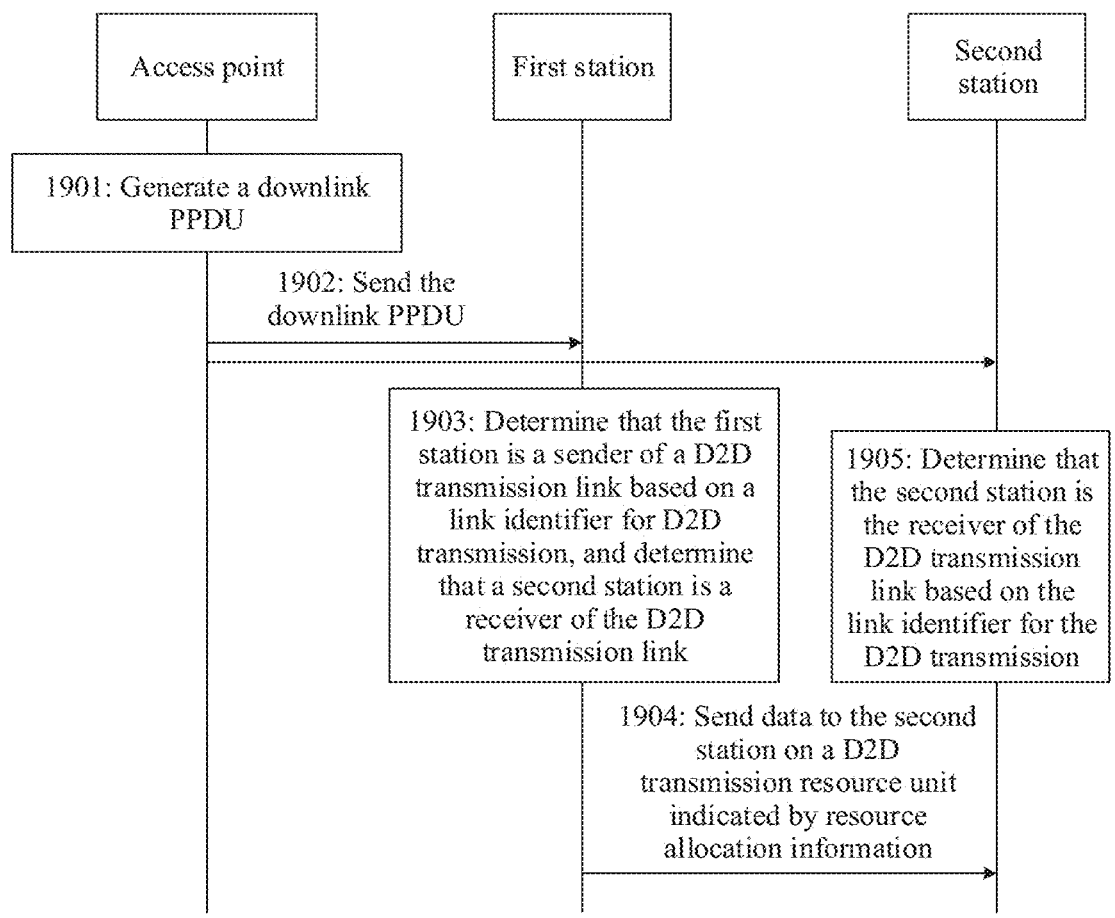
FIG. 19 is a schematic flowchart of yet another D2D transmission method according to an embodiment of this application.

Embodiments of this application further provide a D2D transmission method. The D2D transmission method is applicable to a hybrid transmission scenario in which downlink transmission and D2D transmission are combined in a Wi-Fi system. FIG. 19 is a schematic flowchart of another D2D transmission method according to an embodiment of this application. As shown in FIG. 19, the D2D transmission method includes the following step 1901 to step 1905. The method shown in FIG. 19 may be executed by an access point and a station. Alternatively, the method shown in FIG. 19 may be executed by an access point and a chip in a station. In FIG. 19, an example in which an access point and a station are entities for executing the method is used for description.

1901: An access point generates a physical downlink protocol data unit (PHY protocol data unit, PPDU).

A preamble of the downlink PPDU carries resource allocation information and a link identifier for D2D transmission, and the resource allocation information indicates a resource unit of the D2D transmission. Optionally, the link identifier for the D2D transmission may be a partial identifier or a complete identifier of a link for the D2D transmission. The link identifier for the D2D transmission may be first 10 bits of the link identifier for the D2D transmission.

In a possible implementation, the preamble further includes first indication information, and the first indication information indicates that the resource unit indicated by the resource allocation information is used for the D2D transmission. This possible implementation facilitates the station to distinguish whether the resource unit allocated at a user information field is used for the D2D transmission or downlink transmission. For example, a value of the first indication information may be set to 2046, and the first indication information indicates that the resource unit indicated by the resource allocation information is used for the D2D transmission. Otherwise, the first indication information indicates that the resource unit indicated by the resource allocation information is used for the downlink transmission. Alternatively, when the first indication information indicates that the resource unit indicated by the resource allocation information is used for the D2D transmission, the value of the first indication information is another reserved value specified in the 802.11ax standard protocol. This is not limited in embodiments of this application.

Figure 20:
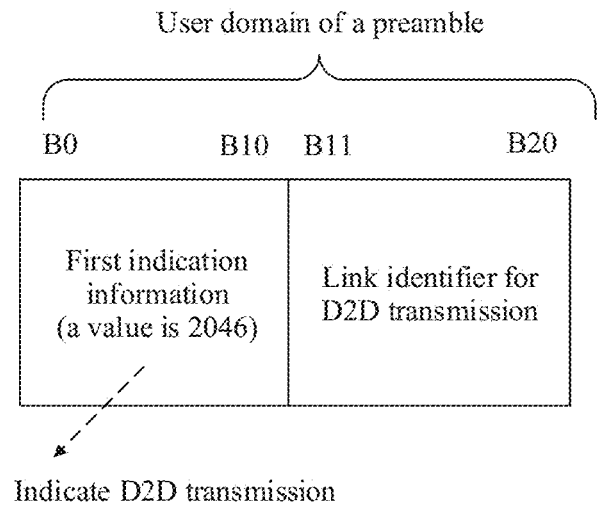
FIG. 20 is a schematic diagram depicting a structure of further another trigger frame according to an embodiment of this application.

In a possible implementation, the first indication information is located at a first bit (B0) to an 11$^{th}$ bit (B10) of a user domain of the preamble. This possible implementation can save bits of the user information field. In a possible implementation, when the first indication information indicates that the resource unit indicated by the resource allocation information is used for the D2D transmission, a 12$^{th}$ bit (B11) to a 21$^{st}$ bit (B20) of the user domain of the preamble carry the link identifier for the D2D transmission. Otherwise, the 12$^{th}$ bit (B11) to the 21st bit (B20) of the user domain of the preamble carry information specified in the 802.11ax standard. For example, FIG. 20 uses an example in which the value of the first indication information is 2046, indicating that a resource allocated by the resource allocation information is used for the D2D transmission.

1902: The access point sends the downlink PPDU.

In embodiments of this application, after generating the downlink PPDU, the access point may send the downlink PPDU. For example, the access point may broadcast the downlink PPDU to a station of the access point.

1903: The first station determines that a first station is a sender of a D2D transmission link based on the link identifier for the D2D transmission, and determines that a second station is a receiver of the D2D transmission link.

In embodiments of this application, the first station and the second station store a correspondence between a link identifier for the D2D transmission and a sender identifier for the D2D transmission link, and a receiver identifier for the D2D transmission link. The first station may determine, based on the correspondence and the link identifier for the D2D transmission carried in the preamble of the downlink PPDU, that the first station is the sender of the D2D transmission link, and determine that the second station is the receiver of the D2D transmission link. After the second station receives the downlink PPDU, the second station determines, based on the correspondence, that the second station is the receiver of the D2D transmission.

1904: The first station sends data to the second station on the 2D transmission resource unit allocated by the resource allocation information.

1905: The second station determines that the second station is the receiver of the D2D transmission link based on the link identifier for the D2D transmission.

In embodiments of this application, after the second station determines, based on the correspondence, that the second station is the receiver of the D2D transmission, the second station receives, on the D2D transmission resource allocated by the resource allocation information, the data sent by the first station.

Figure 21:
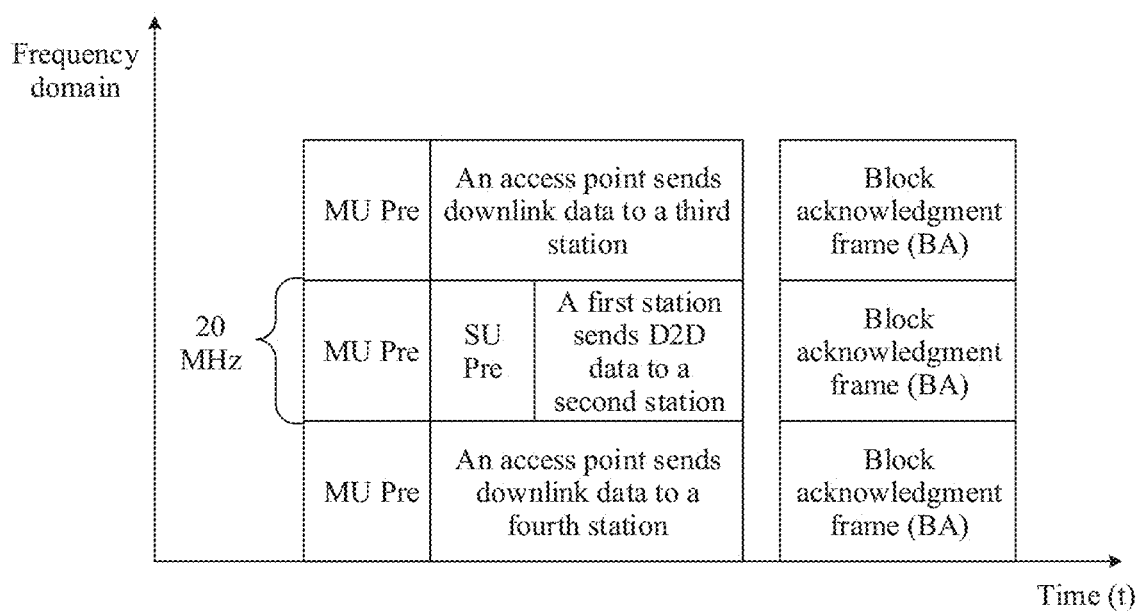
FIG. 21 is a schematic diagram of a D2D transmission method according to an embodiment of this application.

In a possible implementation, as shown in FIG. 21, the first station sends the data to the second station at 20 MHz or an integer multiple of 20 MHz. In other words, the D2D transmission resource unit allocated by the resource allocation information is 20 MHz or an integer multiple of 20 MHz in frequency domain. Optionally, a preamble (preamble) of a PPDU of the D2D transmission may be sent in a single user (single user, SU) format. Based on this possible implementation, because the preamble and a data part occupy a same bandwidth, a physical layer preamble part of the D2D transmission does not overlap the physical layer preamble part of the downlink transmission. This helps avoid interference.

Figure 22:
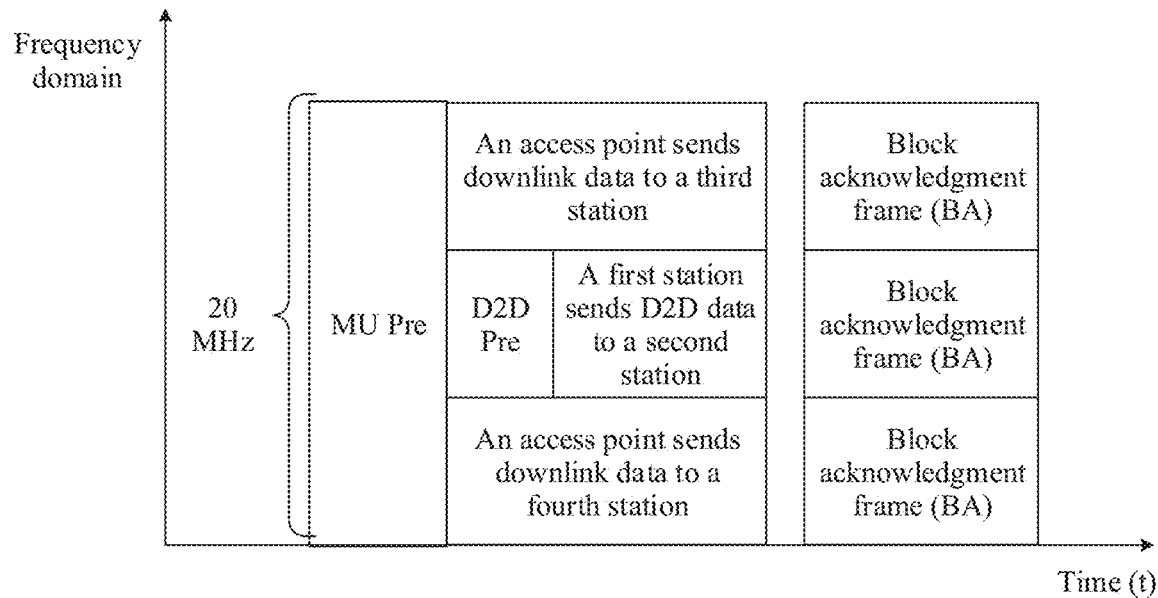
FIG. 22 is a schematic diagram of another D2D transmission method according to an embodiment of this application.

In a possible implementation, as shown in FIG. 22, the first station may send data to the second station on an RU whose granularity is finer, that is, less than 20 MHz. PPDU transmitted on the D2D can operate only within an RU range. In other words, the PPDU transmitted on the D2D (including a preamble) is completely transmitted on the RU. Based on this possible implementation, the D2D transmission resource can be more flexibly allocated.

It can be learned that, According to the method described in FIG. 19, the access point can allocate a D2D transmission resource unit to the first station and the second station, so that the first station and the second station can implement the D2D transmission in a Wi-Fi system.

Figure 23:
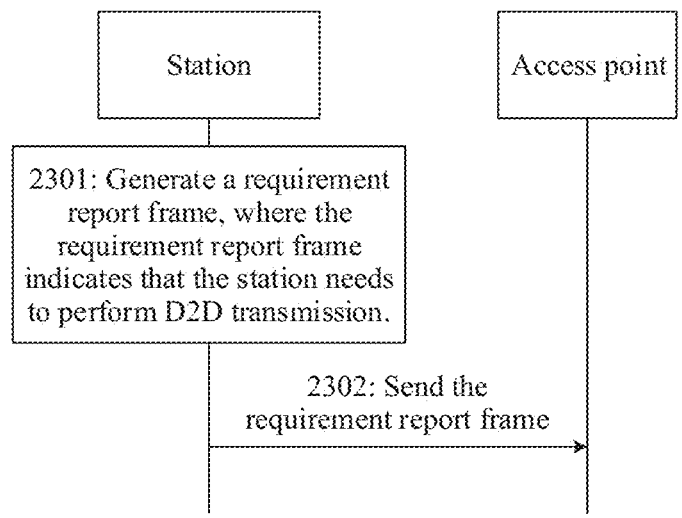
FIG. 23 is a schematic flowchart of a requirement reporting method according to an embodiment of this application.

Embodiments of this application further provide a requirement reporting method. FIG. 23 is a schematic flowchart of a requirement reporting method according to an embodiment of this application. As shown in FIG. 23, the requirement reporting method includes the following step 2301 and step 2302, and the method shown in FIG. 23 may be executed by a station. Alternatively, the method shown in FIG. 23 may be executed by a chip in a station. In FIG. 23, an example in which a station is an entity for executing the method is used for description.

2301: The station generates a requirement report frame.

The requirement report frame indicates that the station needs to perform D2D transmission.

2302: The station sends the requirement report frame to an access point.

Correspondingly, the access point may receive the requirement report frame. Optionally, after receiving the requirement report frame sent by the station, the access point generates a trigger frame, where the trigger frame triggers the station to perform the D2D transmission.

In a possible implementation, the requirement report frame includes requirement report information, and the requirement report information includes one or more pieces of the following information: an identifier of a receiver of the D2D transmission, information used to determine a traffic volume size of the D2D transmission, and a service type of the D2D transmission. Based on the possible implementation, the station can notify the access point of the receiver of the D2D transmission, the traffic volume size of the D2D transmission, and the service type of the D2D transmission.

Optionally, the traffic volume size of the D2D transmission may be a quantity of bytes of a data volume to be sent to a second station that is included in a buffer of the station. Alternatively, the traffic volume size of the D2D transmission may be a traffic volume of a service with a highest priority. Alternatively, the traffic volume size of the D2D transmission may be traffic volumes of all services. Information used to determine the traffic volume size of the D2D transmission may be directly the traffic volume size of the D2D transmission, a length of all queues, or a scaling factor. The length of all queues is a total length of data to be sent in all queues. The access point can determine the traffic volume size of the D2D transmission based on the scaling factor. For example, the traffic volume size of the D2D transmission may be equal to multiplying the scaling factor by a traffic volume unit.

The service type of the D2D transmission may be an access class (ACI) of the D2D transmission, or may be another service type.

In a possible implementation, the requirement report information is carried in a control information field of a high efficient control HE-control field in the requirement report frame. Optionally, the HE-control field may be located at a MAC header. The HE-control field may include a control identifier (control ID) field and a control information (control information) field. The HE-control field may include 30 bits. The control identifier (control ID) field is the first four bits of the HE-control field, and the control information (control information) field is the last 26 bits of the HE-control field.

In a possible implementation, the requirement report frame further includes a control identifier, and the control identifier indicates that the control information field carries the requirement report information for the D2D transmission. Based on this possible implementation, it is helpful for the access point to identify a function of the requirement report frame.

In a possible implementation, the control identifier is carried in a control identifier field of the high efficient control HE-control field in the requirement report frame. Alternatively, the control identifier may be carried in another field of the high efficient control HE-control field.

Figure 24:
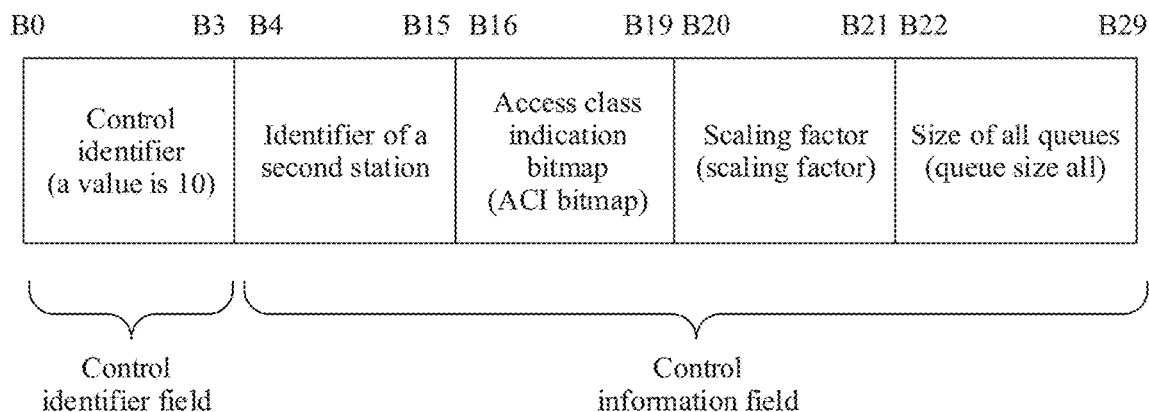
FIG. 24 is a schematic diagram depicting a structure of a requirement report frame according to an embodiment of this application.

For example, as shown in FIG. 24, the HE-control field includes a control identifier (control ID) field and a control information (control information) field. The control identifier (control ID) field is the first four bits of the HE-control field, and the control information (control information) field is the last 26 bits of the HE-control field. When the control identifier indicates that the control information field carries requirement report information for the D2D transmission, a value of the control information is 10 in decimal, or the value of the control information may be any control ID reserved by IEEE 802.11ax. The control information (control information) field includes requirement report information, and the requirement report information includes an identifier of the second station, an access class indication bitmap, a scaling factor, and a size all queues.

In a possible implementation, before the station generates the requirement report frame, the access point sends a requirement report trigger frame to the station, where the requirement report trigger frame is a buffer report trigger frame. After receiving the requirement report trigger frame, the station generates the requirement report frame. In this possible implementation, the station may directly generate the requirement report frame after receiving the buffer report trigger frame. Alternatively, the buffer report trigger frame includes third indication information, and the third indication information indicates that the station is allowed to send the requirement report frame for the D2D transmission. The station generates the requirement report frame only after parsing the third indication information used to indicate that the station is allowed to send the requirement report frame for the D2D transmission. Based on this possible implementation, the access point may trigger, by using an existing trigger frame, the station to send the requirement report frame, and does not need to redesign a trigger frame to trigger the station to send the requirement report frame.

The third indication information may be one or more bits. For example, a bit value of the third indication information is 1 or 0. When the bit value of the third indication information is 1, the third indication information indicates that the station is allowed to send the requirement report frame for the D2D transmission. When the bit value of second indication information is 0, the second indication information indicates that the station is allowed to send the requirement report frame for uplink transmission. Alternatively, when the bit value of the second indication information is 0, the second indication information indicates that the station is allowed to send the requirement report frame for the D2D transmission. When the bit value of the second indication information is 1, the second indication information indicates that the station is allowed to send the requirement report frame for uplink transmission. For another example, when the bit value of the third indication information is 00, the third indication information indicates that the station is allowed to send the requirement report frame for the D2D transmission. When the bit value of the second indication information is 11, the second indication information indicates that the station is allowed to send the requirement report frame for uplink transmission. Alternatively, when the bit value of the second indication information is 11, the second indication information indicates that the station is allowed to send the requirement report frame for the D2D transmission. When the bit value of the second indication information is 00, the second indication information indicates that the station is allowed to send the requirement report frame for uplink transmission.

Figure 25:
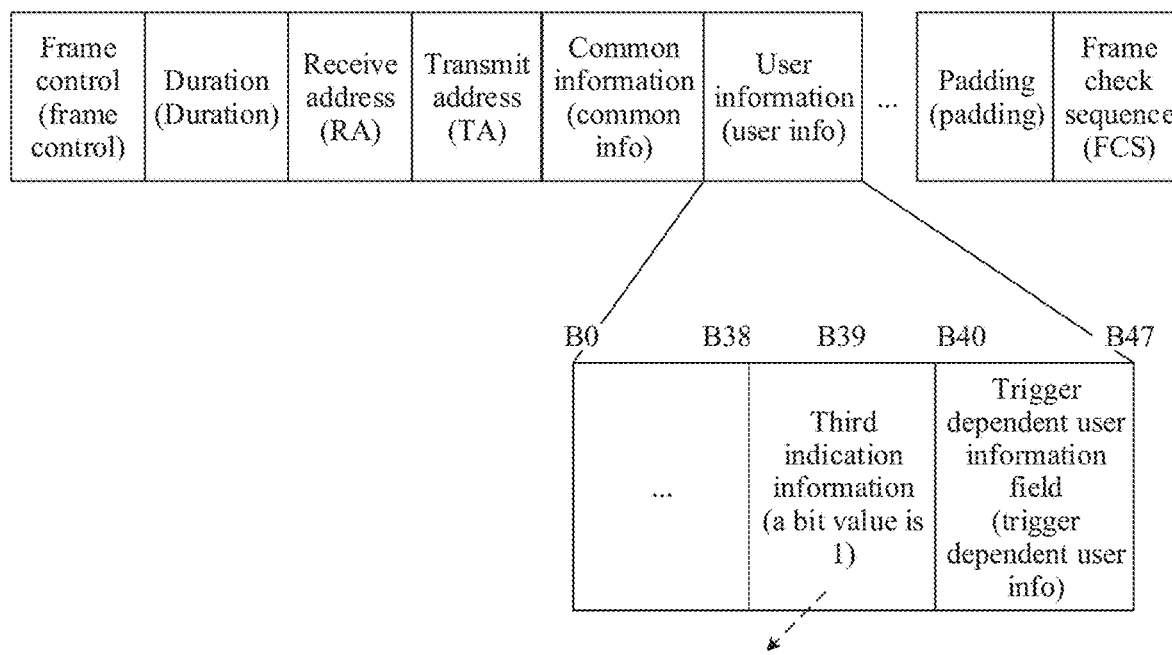
FIG. 25 is a schematic diagram depicting a structure of a requirement report trigger frame according to an embodiment of this application.

In a possible implementation, the third indication information is located at a $40^{th}$ (B39) bit of a user information field in the buffer report trigger frame. Based on this possible implementation, a reserved bit in the 802.11ax standard can be modified to carry the third indication information. This helps save bits of the user information field. For example, as shown in FIG. 25, the $40^{th}$ bit (B39) of the user information field carries the third indication information. When the bit value of the third indication information is 1, the third indication information indicates that the station is allowed to send the requirement report frame for the D2D transmission. When the bit value of the second indication information is 0, the second indication information indicates that the station is allowed to send the requirement report frame for uplink transmission. FIG. 25 uses an example in which the bit value of the third indication information is 1. Alternatively, the third indication information is located at a $46^{th}$ bit (B45) of the user information field in the buffer report trigger frame. In other words, the third indication information is located at a sixth bit (B5) of a trigger dependent user information field (trigger dependent user info) of the user information field in the buffer report trigger frame It can be learned that, by implementing the embodiment described in FIG. 23, the station can feed back a D2D transmission requirement to the access point, so that the access point can allocate the D2D transmission resource unit to the station. Alternatively, the requirement reporting method described in embodiments of this application may be independently implemented. Alternatively, the requirement reporting method described in embodiments of this application may be combined with the embodiment corresponding to the foregoing D2D transmission method. The station may be the sender of the D2D transmission in the procedures described in FIG. 2, FIG. 11. FIG. 15, and FIG. 19. After receiving the requirement report frame, the access point may perform the procedures described in FIG. 2, FIG. 11, FIG. 15, and FIG. 19.

Embodiments of this application further provide a link allocation method. The link allocation method includes: An access point sends a link allocation frame for D2D transmission to a first station and a second station. The link allocation frame includes a link identifier for the D2D transmission, a sender identifier for the D2D transmission, and a receiver identifier for the D2D transmission. The D2D transmission may also be referred to as TDLS transmission. The link allocation frame for the D2D transmission may also be referred to as a TDLS link allocation frame (TDLS link allocation frame).

Figure 26:
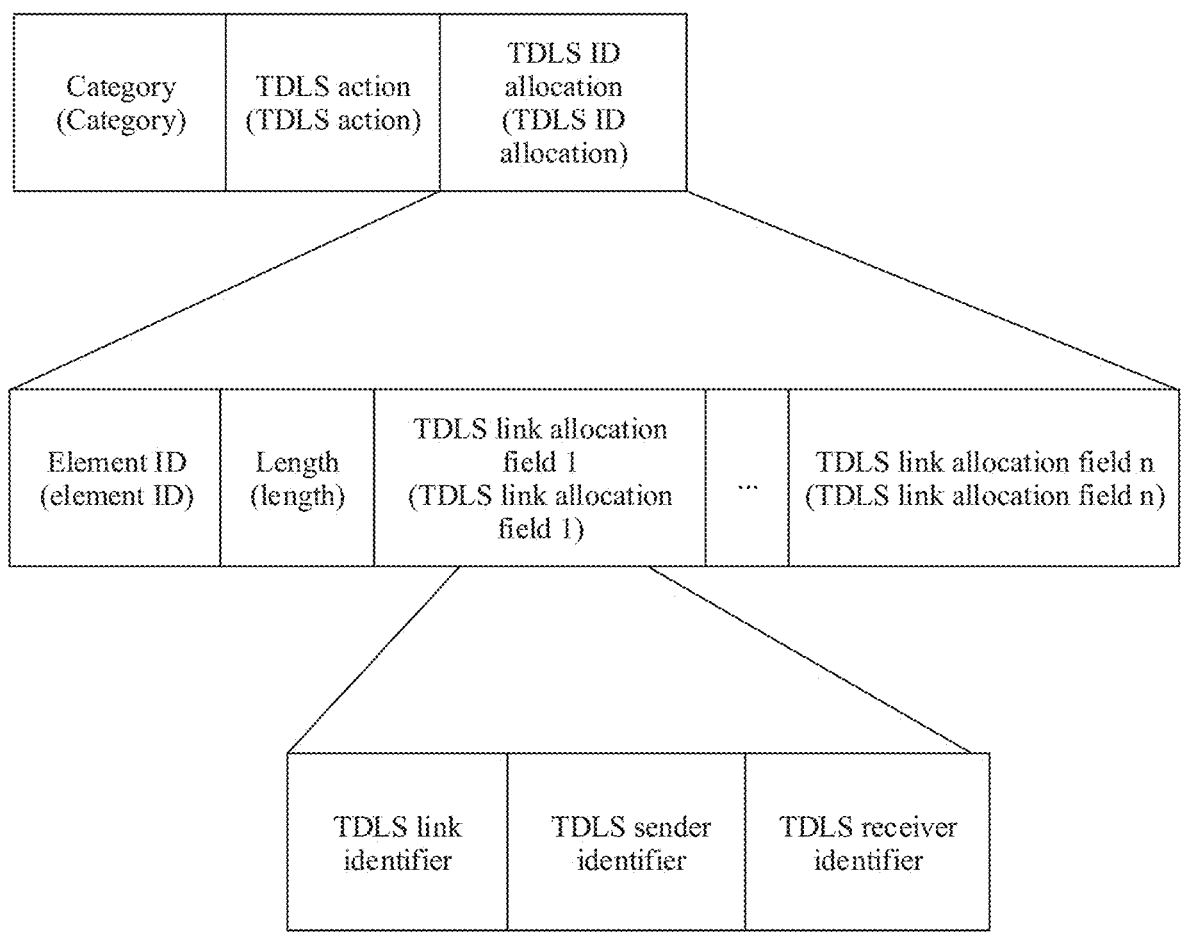
FIG. 26 is a schematic diagram depicting a structure of a link allocation frame according to an embodiment of this application.

In a possible implementation, as shown in FIG. 26, a value of an action field may be added to a TDLS action (TDLS Action) field in an action frame (Action Frame) in the IEEE 802.11 standard. For example, a value 11 is added, 11 indicates TDLS link allocation (TDLS Link Allocation). In other words, when a value of the TDLS action field is 11, the action frame is a TDLS link allocation frame (or referred to as a link allocation frame for the D2D transmission). The TDLS link allocation frame includes a TDLS ID allocation field (TDLS ID allocation field). The field includes a series of TDLS link allocation fields (TDLS link allocation field), and each TDLS link allocation field includes three subfields: TDLS link identifier, TDLS sender identifier, and TDLS receiver identifier (or referred to as a link identifier for the D2D transmission, a sender identifier for the D2D transmission, and a receiver identifier for the D2D transmission).

Alternatively, the access point may send a first link allocation frame for the D2D transmission to the first station, where the first link allocation frame includes the link identifier for the D2D transmission and the sender identifier for the D2D transmission. The access point sends a second link allocation frame for the D2D transmission to the second station, where the second link allocation frame includes the link identifier for D2D transmission and the receiver identifier for D2D transmission.

It can be learned that, by implementing the link allocation method, the access point may allocate a D2D link to the first station and the second station. The link allocation method described in embodiments of this application may be independently implemented. Alternatively, the link allocation method described in embodiments of this application may be combined with the embodiment corresponding to the foregoing D2D transmission method. For example, after sending the link identifier, the access point may perform the procedures described in FIG. 2, FIG. 11, FIG. 15, FIG. 19, and FIG. 23.

Figure 27:
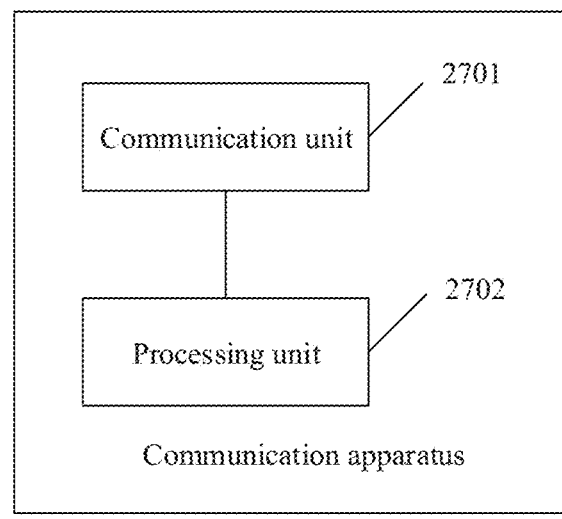
FIG. 27 is a schematic diagram depicting a structure of a communication apparatus according to an embodiment of this application.

FIG. 27 is a schematic diagram depicting a structure of a communication apparatus according to an embodiment of this application. The communication apparatus shown in FIG. 27 may be configured to perform some or all functions of the first station in the method embodiment described in FIG. 2. The apparatus may be the first station, an apparatus in the first station, or an apparatus that can be used together with the first station. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The communication unit 2701 is configured to receive a trigger frame sent by an access point, where the trigger frame includes a user information field. The user information field includes an identifier of the communication apparatus, resource allocation information, first indication information, and second indication information. The first indication information indicates that a resource unit indicated by the resource allocation information is used for device-to-device D2D transmission. The second indication information indicates that the communication apparatus is a sender or a receiver of the D2D transmission. The communication unit 2701 is further configured to send data to a second station on a D2D transmission resource unit indicated by resource allocation information.

In a possible implementation, the user information field includes 48 bits.

In a possible implementation, the first indication information is located at a $40^{th}$ bit of the user information field.

In a possible implementation, the second indication information is located at a $46^{th}$ bit of the user information field.

FIG. 27 is a schematic diagram depicting a structure of a communication apparatus according to an embodiment of this application. The communication apparatus shown in FIG. 27 may be configured to perform some or all functions of the access point in the method embodiment described in FIG. 2. The apparatus may be an access point, an apparatus in an access point, or an apparatus that can be used together with an access point. The communication apparatus may alternatively be a chip system. The communication apparatus shown in FIG. 27 may include the communication unit 2701 and the processing unit 2702. The communication unit may alternatively be referred to as a transceiver unit, or the communication unit includes a receiving unit and a sending unit. The processing unit 2702 is configured to process data.

The processing unit 2702 is configured to generate the trigger frame, where the trigger frame includes the user information field. The user information field includes an identifier of a station, the resource allocation information, the first indication information, and the second indication information. The first indication information indicates that the resource unit indicated by the resource allocation information is used for the device-to-device D2D transmission. The second indication information indicates that the station is the sender or the receiver of the D2D transmission. The communication unit 2701 is configured to send a trigger frame.

In a possible implementation, the user information field includes 48 bits.

In a possible implementation, the first indication information is located at a $40^{th}$ bit of the user information field.

In a possible implementation, the second indication information is located at a $46^{th}$ bit of the user information field.

FIG. 27 is a schematic diagram depicting a structure of a communication apparatus according to an embodiment of this application. The communication apparatus shown in FIG. 27 may be configured to perform some or all functions of the first station in the method embodiment described in FIG. 11. The apparatus may be the first station, an apparatus in the first station, or an apparatus that can be used together with the first station. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The communication unit 2701 is configured to receive a trigger frame sent by the access point, where the trigger frame includes a user information field. The user information field includes the identifier of the communication apparatus, the resource allocation information, the first indication information, and first identification information. The communication apparatus is the sender of the D2D transmission. The first indication information indicates that the resource unit indicated by the resource allocation information is used for the D2D transmission. The first identification information is an identifier of the second station. The second station is the receiver of the D2D transmission, or the first identification information is a link identifier for the D2D transmission. The communication unit 2701 is further configured to send data to the second station on the D2D transmission resource unit indicated by the resource allocation information.

If the first identification information is the link identifier for the D2D transmission, after the communication unit 2701 receives the trigger frame, the processing unit 2702 determines, based on the link identifier for the D2D transmission, that the second station is the receiver of the D2D transmission. After determining that the second station is the receiver of the D2D transmission, the processing unit 2702 sends the data to the second station on the D2D transmission resource unit indicated by the resource allocation information.

In a possible implementation, the first identification information may be a partial identifier or a complete identifier of the second station.

In a possible implementation, the user information field in the trigger frame includes 48 bits.

In a possible implementation, the first indication information is located at a 40th bit (B39) of the user information field; or the first indication information is located at a 12th bit (B11) of the user information field; or the first indication information is located at a 46th bit (B45) of the user information field. In other words, the first indication information is located at a sixth bit (B5) of a trigger dependent user information field (trigger dependent user info) in the first user information field.

In a possible implementation, the first identification information is located at a 33rd bit (B32) to a 39th bit (B38) of the user information field.

FIG. 27 is a schematic diagram depicting a structure of a communication apparatus according to an embodiment of this application. The communication apparatus shown in FIG. 27 may be configured to perform some or all functions of the second station in the method embodiment described in FIG. 11. The apparatus may be the second station, an apparatus in the second station, or an apparatus that can be used together with the second station. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The communication unit 2701 is configured to receive a trigger frame sent by the access point, where the trigger frame includes a user information field. The user information field includes the identifier of the first station, the resource allocation information, the first indication information, and first identification information. The first station is the sender of the D2D transmission. The first indication information indicates that the resource unit indicated by the resource allocation information is used for the D2D transmission. The first identification information is an identifier of the communication apparatus. The communication apparatus is the receiver of the D2D transmission, or the first identification information is a link identifier for the D2D transmission. The communication unit 2701 is further configured to receive data sent by the first station on the D2D transmission resource unit allocated by the resource allocation information.

If the first identification information is the link identifier for the D2D transmission, after the communication unit 2701 receives the trigger frame, the processing unit 2702 determines, based on the link identifier for the D2D transmission, that the communication apparatus is the receiver of the D2D transmission. After determining that the communication apparatus is the receiver of the D2D transmission, the processing unit 2702 receives the data sent by the first station on the D2D transmission resource unit indicated by the resource allocation information.

In a possible implementation, the first identification information may be a partial identifier or a complete identifier of the second station.

In a possible implementation, the user information field in the trigger frame includes 48 bits.

In a possible implementation, the first indication information is located at a 40th bit (B39) of the user information field; or the first indication information is located at a 12th bit (B11) of the user information field; or the first indication information is located at a 46th bit (B45) of the user information field. In other words, the first indication information is located at a sixth bit (B5) of a trigger dependent user information field (trigger dependent user info) in the first user information field.

In a possible implementation, the first identification information is located at a 33rd bit (B32) to a 39th bit (B38) of the user information field.

FIG. 27 is a schematic diagram depicting a structure of a communication apparatus according to an embodiment of this application. The communication apparatus shown in FIG. 27 may be configured to perform some or all functions of the access point in the method embodiment described in FIG. 11. The apparatus may be an access point, an apparatus in an access point, or an apparatus that can be used together with an access point. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The processing unit 2702 is configured to generate the trigger frame, where the trigger frame includes the user information field. The user information field includes the identifier of the first station, the resource allocation information, the first indication information, and first identification information. The first station is the sender of the D2D transmission. The first indication information indicates that the resource unit indicated by the resource allocation information is used for the D2D transmission. The first identification information is an identifier of the communication apparatus. The communication apparatus is the receiver of the D2D transmission, or the first identification information is a link identifier for the D2D transmission. The communication unit 2701 is configured to send the trigger frame.

In a possible implementation, the first identification information may be a partial identifier or a complete identifier of the second station.

In a possible implementation, the user information field in the trigger frame includes 48 bits.

In a possible implementation, the first indication information is located at a 40th bit (B39) of the user information field; or the first indication information is located at a 12th bit (B11) of the user information field; or the first indication information is located at a 46th bit (B45) of the user information field. In other words, the first indication information is located at a sixth bit (B5) of a trigger dependent user information field (trigger dependent user info) in the first user information field.

In a possible implementation, the first identification information is located at a 33rd bit (B32) to a 39th bit (B38) of the user information field.

FIG. 27 is a schematic diagram depicting a structure of a communication apparatus according to an embodiment of this application. The communication apparatus shown in FIG. 27 may be configured to perform some or all functions of the first station in the method embodiment described in FIG. 15. The apparatus may be the first station, an apparatus in the first station, or an apparatus that can be used together with the first station. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The communication unit 2701 is configured to receive the trigger frame sent by the access point, where the user information field in the trigger frame includes the link identifier for the D2D transmission and resource allocation information of the D2D transmission. The processing unit 2702 is configured to determine, based on the link identifier for the D2D transmission, that the communication apparatus is the sender of the D2D transmission link, and determine that the second station is the receiver of the D2D transmission link. The communication unit 2701 is further configured to send the data to the second station on the D2D transmission resource unit indicated by the resource allocation information.

In a possible implementation, the user information field in the trigger frame includes 48 bits.

In a possible implementation, the link identifier for the D2D transmission is located at a first bit (B0) to a $12^{th}$ bit (B11) of the user information field.

In a possible implementation, the user information field further includes first indication information, and the first indication information indicates a resource allocated by the resource allocation information is used for the D2D transmission. Optionally, the first indication information may be in the first bit (B0) to the $12^{th}$ bit (B11) of the user information field, the link identifier for the D2D transmission is located at a $33^{rd}$ bit (B32) to a $39^{th}$ bit (B38) of the user information field, or the link identifier for the D2D transmission is located at the $33^{rd}$ bit (B32) to a $40^{th}$ bit (B39) of the user information field. Optionally, when the first indication information indicates that the resource indicated by the resource allocation information is used for the D2D transmission, a value of the first indication information may be any one of 2008 to 2044 and 2047 to 4094.

FIG. 27 is a schematic diagram depicting a structure of a communication apparatus according to an embodiment of this application. The communication apparatus shown in FIG. 27 may be configured to perform some or all functions of the second station in the method embodiment described in FIG. 15. The apparatus may be the second station, an apparatus in the second station, or an apparatus that can be used together with the second station. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The communication unit 2701 is configured to receive the trigger frame sent by the access point, where the user information field in the trigger frame includes the link identifier for the D2D transmission and resource allocation information of the D2D transmission. The processing unit 2702 is configured to determine, based on the link identifier for the D2D transmission, that the second station is the receiver of the D2D transmission link. The communication unit 2701 is further configured to receive the data sent by the first station on the D2D transmission resource unit indicated by the resource allocation information.

In a possible implementation, the user information field in the trigger frame includes 48 bits.

In a possible implementation, the link identifier for the D2D transmission is located at a first bit (B0) to a $12^{th}$ bit (B11) of the user information field.

In a possible implementation, the user information field further includes first indication information, and the first indication information indicates a resource allocated by the resource allocation information is used for the D2D transmission. Optionally, the first indication information may be in the first bit (B0) to the $12^{th}$ bit (B11) of the user information field, the link identifier for the D2D transmission is located at a $33^{rd}$ bit (B32) to a $39^{th}$ bit (B38) of the user information field, or the link identifier for the D2D transmission is located at the $33^{rd}$ bit (B32) to a $40^{th}$ bit (B39) of the user information field. Optionally, when the first indication information indicates that the resource allocated by the resource allocation information is used for the D2D transmission, a value of the first indication information may be any one of 2008 to 2044 and 2047 to 4094.

FIG. 27 is a schematic diagram depicting a structure of a communication apparatus according to an embodiment of this application. The communication apparatus shown in FIG. 27 may be configured to perform some or all functions of the access point in the method embodiment described in FIG. 15. The apparatus may be an access point, an apparatus in an access point, or an apparatus that can be used together with an access point. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The processing unit 2702 is configured to generate the trigger frame, where the user information field in the trigger frame includes the link identifier for the D2D transmission and the resource allocation information of the D2D transmission. The communication unit 2701 is configured to send the trigger frame.

In a possible implementation, the user information field in the trigger frame includes 48 bits.

In a possible implementation, the link identifier for the D2D transmission is located at a first bit (B0) to a $12^{th}$ bit (B11) of the user information field.

In a possible implementation, the user information field further includes first indication information, and the first indication information indicates that a resource unit indicated by the resource allocation information is used for the D2D transmission. Optionally, the first indication information may be in the first bit (B0) to the $12^{th}$ bit (B11) of the user information field, the link identifier for the D2D transmission is located at a $33^{rd}$ bit (B32) to a $39^{th}$ bit (B38) of the user information field, or the link identifier for the D2D transmission is located at the $33^{rd}$ bit (B32) to a $40^{th}$ bit (B39) of the user information field. Optionally, when the first indication information indicates that the resource allocated by the resource allocation information is used for the D2D transmission, a value of the first indication information may be any one of 2008 to 2044 and 2047 to 4094.

FIG. 27 is a schematic diagram depicting a structure of a communication apparatus according to an embodiment of this application. The communication apparatus shown in FIG. 27 may be configured to perform some or all functions of the first station in the method embodiment described in FIG. 19. The apparatus may be the first station, an apparatus in the first station, or an apparatus that can be used together with the first station. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The communication unit 2701 is configured to receive a downlink PPDU sent by the access point, where a preamble of the downlink PPDU carries the resource allocation information and the link identifier for the D2D transmission. The resource allocation information indicates a resource unit for the D2D transmission. The processing unit 2702 is configured to determine, based on the link identifier for the D2D transmission, that the communication apparatus is the sender of the D2D transmission link, and determine that the second station is the receiver of the D2D transmission link. The communication unit 2701 is further configured to send the data to the second station on the D2D transmission resource unit indicated by the resource allocation information.

In a possible implementation, the preamble further includes first indication information, and the first indication information allocates the resource indicated by the resource allocation information is used for the D2D transmission.

In a possible implementation, the first indication information is located at a first bit (B0) to an $11^{th}$ bit (B10) of a user domain of the preamble.

FIG. 27 is a schematic diagram depicting a structure of a communication apparatus according to an embodiment of this application. The communication apparatus shown in FIG. 27 may be configured to perform some or all functions of the second station in the method embodiment described in FIG. 19. The apparatus may be the second station, an apparatus in the second station, or an apparatus that can be used together with the second station. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The communication unit 2701 is configured to receive the downlink PPDU sent by the access point, where the preamble of the downlink PPDU carries the resource allocation information and the link identifier for the D2D transmission. The resource allocation information indicates a resource unit for the D2D transmission. The processing unit 2702 is configured to determine, based on the link identifier for the D2D transmission, that the communication apparatus is the receiver of the D2D transmission link. The communication unit 2701 is further configured to receive the data sent by the first station on the D2D transmission resource unit allocated by the resource allocation information.

In a possible implementation, the preamble further includes first indication information, and the first indication information indicates that the resource unit indicated by the resource allocation information is used for the D2D transmission.

In a possible implementation, the first indication information is located at a first bit (B0) to an $11^{th}$ bit (B10) of a user domain of the preamble.

FIG. 27 is a schematic diagram depicting a structure of a communication apparatus according to an embodiment of this application. The communication apparatus shown in FIG. 27 may be configured to perform some or all functions of the access point in the method embodiment described in FIG. 19. The apparatus may be an access point, an apparatus in an access point, or an apparatus that can be used together with an access point. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The processing unit 2702 is configured to generate the downlink PPDU, where the preamble of the downlink PPDU carries the resource allocation information and the link identifier for the D2D transmission, and the resource allocation information indicates the resource unit for D2D transmission. The communication unit 2701 is configured to send the downlink PPDU.

In a possible implementation, the preamble further includes first indication information, and the first indication information indicates that the resource unit indicated by the resource allocation information is used for the D2D transmission.

In a possible implementation, the first indication information is located at a first bit (B0) to an $11^{th}$ bit (B10) of a user domain of the preamble.

FIG. 27 is a schematic diagram depicting a structure of a communication apparatus according to an embodiment of this application. The communication apparatus shown in FIG. 27 may be configured to perform some or all functions of the station in the method embodiment described in FIG. 23. The apparatus may be a station, an apparatus in a station, or an apparatus that can be used together with a station. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The processing unit 2702 is configured to generate a requirement report frame, where the requirement report frame indicates that the communication apparatus needs to perform the D2D transmission. The communication unit 2701 is configured to send the requirement report frame to the access point.

In a possible implementation, the requirement report frame includes requirement report information, and the requirement report information includes one or more pieces of the following information: an identifier of a receiver of the D2D transmission, information used to determine a traffic volume size of the D2D transmission, and a service type of the D2D transmission.

In a possible implementation, the requirement report information is carried in a control information field of a high efficient control HE-control field in the requirement report frame.

In a possible implementation, the requirement report frame further includes a control identifier, and the control identifier indicates that the control information field carries the requirement report information for the D2D transmission.

In a possible implementation, the control identifier is carried in a control identifier field of the high efficient control HE-control field in the requirement report frame.

In a possible implementation, the communication unit 2701 is further configured to: before the processing unit 2702 generates the requirement report frame, receive a requirement report trigger frame sent by the access point, where the requirement report trigger frame is a buffer report trigger frame.

In a possible implementation, the buffer report trigger frame includes third indication information, and the third indication information indicates that the communication apparatus is allowed to send the requirement report frame for the D2D transmission.

In a possible implementation, the third indication information is located at a $40^{th}$ (B39) bit of a user information field in the buffer report trigger frame.

The communication apparatus may independently implement or may further implement the foregoing functions of a D2D sender in the foregoing D2D transmission method.

FIG. 27 is a schematic diagram depicting a structure of a communication apparatus according to an embodiment of this application. The communication apparatus shown in FIG. 27 may be configured to perform some or all functions of the access point in the method embodiment described in FIG. 23. The apparatus may be an access point, an apparatus in an access point, or an apparatus that can be used together with an access point. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The communication unit 2701 is configured to receive the requirement report frame, where the requirement report frame indicates that the station needs to perform the D2D transmission.

Optionally, the processing unit 2702 is configured to generate the trigger frame after the communication unit 2701 receives the requirement report frame sent by the station, where the trigger frame triggers the station to perform the D2D transmission.

In a possible implementation, the requirement report frame includes requirement report information, and the requirement report information includes one or more pieces of the following information: an identifier of a receiver of the D2D transmission, information used to determine a traffic volume size of the D2D transmission, and a service type of the D2D transmission.

In a possible implementation, the requirement report information is carried in a control information field of a high efficient control HE-control field in the requirement report frame.

In a possible implementation, the requirement report frame further includes a control identifier, and the control identifier indicates that the control information field carries the requirement report information for the D2D transmission.

In a possible implementation, the control identifier is carried in a control identifier field of the high efficient control HE-control field in the requirement report frame.

In a possible implementation, the communication unit 2701 is further configured to: before receiving the requirement report frame, send the requirement report trigger frame to the station, where the requirement report trigger frame is the buffer report trigger frame.

In a possible implementation, the buffer report trigger frame includes the third indication information, and the third indication information indicates that the station is allowed to send the requirement report frame for the D2D transmission.

In a possible implementation, the third indication information is located at a $40^{th}$ (B39) bit of a user information field in the buffer report trigger frame.

The communication apparatus may independently implement or may further implement the foregoing functions of the access point in the foregoing D2D transmission method.

FIG. 27 is a schematic diagram depicting a structure of a communication apparatus according to an embodiment of this application. The communication apparatus shown in FIG. 27 may be configured to perform some or all functions of the first station or the second station in the foregoing link allocation method. The apparatus may be the first station, or may be an apparatus in the first station or in the second station, or an apparatus that can match the first station or the second station. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The communication unit 2701 is configured to receive a link allocation frame for the D2D transmission sent by the access point, where the link allocation frame includes the link identifier for the D2D transmission, the sender identifier for the D2D transmission, and the receiver identifier for the D2D transmission.

The communication apparatus may independently implement or may further implement the foregoing functions of the sender or the receiver for implementing D2D transmission in the foregoing D2D transmission method.

FIG. 27 is a schematic diagram depicting a structure of a communication apparatus according to an embodiment of this application. The communication apparatus shown in FIG. 27 may be configured to perform some or all functions of the access point in the foregoing link allocation method. The apparatus may be an access point, an apparatus in an access point, or an apparatus that can be used together with an access point. The communication apparatus may alternatively be a chip system. The communication apparatus shown in FIG. 27 may include a communication unit 2701 and a processing unit 2702. The communication unit may alternatively be referred to as a transceiver unit, or the communication unit includes a receiving unit and a sending unit. The processing unit 2702 is configured to process data.

The communication unit 2701 is configured to send the link allocation frame for the D2D transmission to the first station and the second station, where the link allocation frame includes the link identifier for the D2D transmission, the sender identifier for the D2D transmission, and the receiver identifier for the D2D transmission.

The communication apparatus may independently implement or may further implement the foregoing functions of the access point in the foregoing D2D transmission method.

Figure 28A:
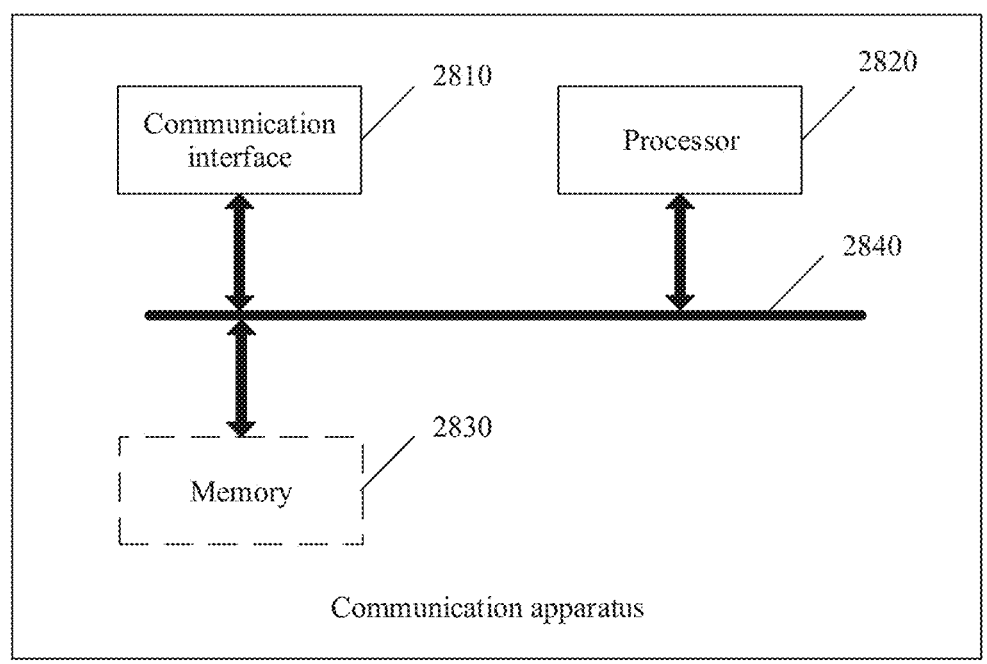
FIG. 28*a* is a schematic diagram depicting a structure of another communication apparatus according to an embodiment of this application.

FIG. 28a shows a communication apparatus 280 according to an embodiment of this application, configured to implement a function of the station or the access point in the method embodiment described in FIG. 2 or FIG. 23. Alternatively, the apparatus is configured to implement a function of the first station, the second station, or the access point in the method embodiment described in FIG. 11, FIG. 15, or FIG. 19. Alternatively, the apparatus may be a station, a first station, a second station, or an access point, or the apparatus may be an apparatus for a station, an apparatus for a first station, an apparatus for a second station, or an apparatus for an access point. The apparatus used in the station may be a chip system in the station or a chip in the station. The apparatus used in the first station may be a chip system in the first station or a chip in the first station. The apparatus used in the second station may be a chip system in the second station or a chip in the second station. The apparatus used in the access point may be a chip system in the access point or a chip in the access point. The chip system may include a chip, or may include a chip and another discrete device.

The communication apparatus 280 includes at least one processor 2820, configured to implement a data processing function of the station, the first station, the second station, or the access point in the foregoing D2D transmission method in this application. Alternatively, the processor is configured to implement a data processing function of the station or the access point in the foregoing requirement reporting method in this application. Alternatively, the processor is configured to implement a data processing function of the first station, the second station, or the access point in the foregoing link allocation method in this application.

The apparatus 280 may further include a communication interface 2810, configured to implement a sending and receiving operation of the station, the first station, the second station, or the access point in the foregoing D2D transmission method in this application. Alternatively, the interface is configured to implement a sending/receiving operation of the station or the access point in the foregoing requirement reporting method in this application. Alternatively, the interface is configured to implement a receiving and sending operation of the first station, the second station, or the access point in the foregoing link allocation method in this application.

In the embodiments of this application, the communication interface may be a transceiver, a circuit, a bus, a module, or a communication interface of another type, and is configured to communicate with another device through a transmission medium. For example, the communication interface 2810 is used by an apparatus in the apparatus 280 to communicate with the another device. The processor 2820 receives and sends data through the communication interface 2810, and is configured to implement the method in the foregoing method embodiments.

The apparatus 280 may further include at least one memory 2830, configured to store program instructions and/or data. The memory 2830 is coupled to the processor 2820. Coupling in embodiments of this application is indirect coupling or a communication connection between apparatuses, units, or modules, and may be in an electrical, mechanical, or another form, and is used for information exchange between the apparatuses, units, or modules. The processor 2820 may collaborate with the memory 2830. The processor 2820 may execute the program instructions stored in the memory 2830. At least one of the at least one memory may be included in the processor.

In embodiments of this application, a specific connection medium between the communication interface 2810, the processor 2820, and the memory 2830 is not limited. In embodiments of this application, the memory 2830, the communication interface 2810, and the communication interface 2810 are connected through a bus 2840 in FIG. 28a. The bus is represented by a bold line in FIG. 28a. A manner of connection between other components is schematically described, and is not limited thereto. The bus may be classified into an address bus, a data bus, a control bus, and the like. For ease of representation, only one thick line is used to represent the bus in FIG. 28a, but this does not mean that there is only one bus or only one type of bus.

When the apparatus 280 is specifically an apparatus used for a station, a first station, a second station, or an access point, for example, when the apparatus 280 is specifically a chip or a chip system, the communication interface 2810 may output or receive a baseband signal. When the apparatus 280 is specifically a station, a first station, a second station, or an access point, the communication interface 2810 may output or receive a radio frequency signal. In embodiments of this application, the processor may be a general-purpose processor, a digital signal processor, an application-specific integrated circuit, a field-programmable gate array or another programmable logic device, a discrete gate or a transistor logic device, or a discrete hardware component, and may implement or perform the methods, steps, and logical block diagrams disclosed in embodiments of this application. The general purpose processor may be a microprocessor or any conventional processor or the like. The steps of the method disclosed with reference to the embodiments of this application may be directly performed by a hardware processor, or may be performed by using a combination of hardware and software modules in the processor.

Figure 28B:
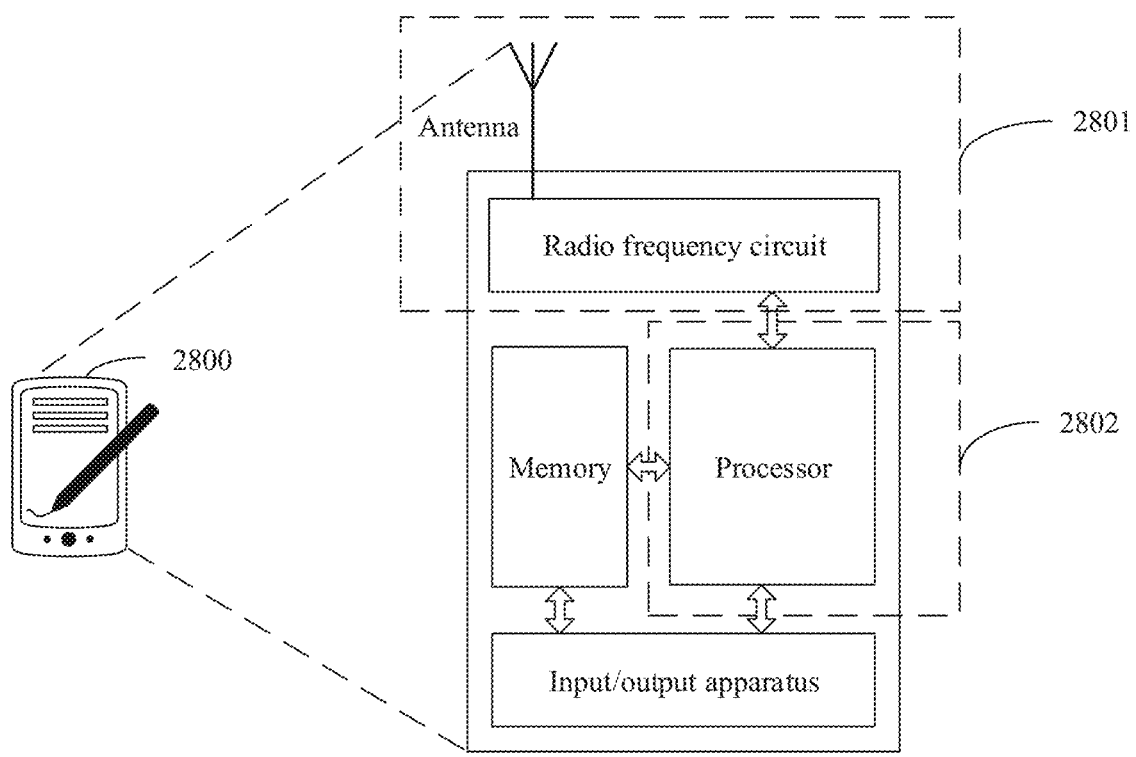
FIG. 28*b* is a schematic diagram depicting a structure of still another communication apparatus according to an embodiment of this application.

For example, FIG. 28b is a schematic diagram depicting another structure of a station 2800 according to an embodiment of this application. The station may perform an operation performed by the station in FIG. 2 or FIG. 23, or may perform an operation performed by the first station in FIG. 11, FIG. 15, or FIG. 19, or the station may perform an operation performed by the second station in FIG. 11, FIG. 15, or FIG. 19.

For ease of description, FIG. 28b shows only main components of the station. As shown in FIG. 28b, the station 2800 includes a processor, a memory, a radio frequency circuit, an antenna, and an input/output apparatus. The processor is mainly configured to: process a communication protocol and communication data, control an entire station, execute a software program, and process data of the software program. For example, the processor is configured to support the station in performing an operation performed by the first station in the procedure described in FIG. 2 or FIG. 23, or support the station in performing an operation performed by the first station in the procedure described in FIG. 11, FIG. 15, or FIG. 19, or support the station in performing an operation performed by the second station in the procedure described in FIG. 11, FIG. 15, or FIG. 19. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The station 2800 may further include an input/output apparatus, for example, a touchscreen, a display screen, or a keyboard, which is mainly configured to receive data entered by a user and output data to the user. It should be noted that some types of stations may not have an input/output apparatus.

After the station is powered on, the processor may read the software program in a storage unit, parse and execute instructions of the software program, and process the data of the software program. When data needs to be sent in a wireless manner, after performing baseband processing on the to-be-sent data, the processor outputs a baseband signal to the radio frequency circuit. After performing radio frequency processing on the baseband signal, the radio frequency circuit sends a radio frequency signal in a form of an electromagnetic wave through the antenna. When data is sent to the terminal, the radio frequency circuit receives the radio frequency signal through the antenna, converts the radio frequency signal into a baseband signal, and outputs the baseband signal to the processor. The processor converts the baseband signal into data and processes the data.

A person skilled in the art may understand that for ease of description, FIG. 28b shows only one memory and one processor. An actual station may include a plurality of processors and memories. The memory may also be referred to as a storage medium, a storage device, or the like. This is not limited in embodiments of this application.

In an optional implementation, the processor may include a baseband processor and a central processing unit (central processing unit, CPU). The baseband processor is mainly configured to process a communication protocol and communication data. The CPU is mainly configured to: control the entire station, execute a software program, and process data of the software program. Optionally, the processor may alternatively be a network processor (network processor, NP) or a combination of a CPU and an NP. The processor may further include a hardware chip. The hardware chip may be an application-specific integrated circuit (application-specific integrated circuit, ASIC), a programmable logic device (programmable logic device. PLD), or a combination thereof. The PLD may be a complex programmable logic device (complex programmable logic device, CPLD), a field-programmable gate array (field-programmable gate array, FPGA), generic array logic (generic array logic, GAL), or any combination thereof. The memory may include a volatile memory (volatile memory), for example, a random access memory (random access memory, RAM). The memory may alternatively include a non-volatile memory (non-volatile memory), for example, a flash memory (flash memory), a hard disk drive (hard disk drive, HDD), or a solid-state drive (solid-state drive, SSD). The memory may alternatively include a combination of the foregoing types of memories.

For example, in embodiments of this application, as shown in FIG. 28b, the antenna and the radio frequency circuit that have a transceiver function may be considered as a communication unit 2801 of the station 2800, and the processor with a processing function may be considered as a processing unit 2802 of the station 2800.

The communication unit 2801 may alternatively be referred to as a transceiver, a receiver-transmitter, a transceiver apparatus, a transceiver unit, or the like, and is configured to implement the transceiver function. Optionally, a component that is in the communication unit 2801 and that is configured to implement a receiving function may be considered as a receiving unit, and a component that is in the communication unit 2801 and that is configured to implement a sending function may be considered as a sending unit. In other words, the communication unit 2801 includes the receiving unit and the sending unit. For example, the receiving unit may also be referred to as a receiver machine, a receiver, or a receiver circuit, and the sending unit may be referred to as a transmitter machine, a transmitter, or a transmitter circuit.

In some embodiments, the communication unit 2801 and the processing unit 2802 may be integrated into one device, or may be separated as different devices. In addition, the processor and the memory may be integrated into one device, or may be separated as different devices.

The communication unit 2801 may be configured to perform the receiving and sending operations of the station, the first station, or the second station in the foregoing method embodiments. The processing unit 2802 may be configured to perform the data processing operation of the station, the first station, or the second station in the foregoing method embodiments.

Embodiments of this application provide a computer-readable storage medium. The computer-readable storage medium stores instructions, and when the instructions are run on a computer, the instructions are configured to perform the method performed by the station in the foregoing method embodiments.

Embodiments of this application provide a computer-readable storage medium. The computer-readable storage medium stores instructions, and when the instructions are run on a computer, the instructions are configured to perform the method performed by the access point in the foregoing method embodiments.

An embodiment of this application further provides a computer program product. When the computer program product runs on a processor, the computer program product is configured to perform the method performed by the station in the foregoing method embodiments.

An embodiment of this application further provides a computer program product. When the computer program product runs on a processor, the computer program product is configured to perform the method performed by the access point in the foregoing method embodiments.

Based on a same inventive idea, a problem-resolving principle of the apparatus provided in embodiments of this application is similar to that of the method embodiments of this application. Therefore, for implementation of the apparatus, refer to the implementation of the methods. For brevity of description, details are not described herein again.

It should be noted that for ease of brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification all belong to example embodiments, and the involved actions and modules are not necessarily required by this application.

Description of the embodiments provided in this application may refer to each other, and description of the embodiments has different focuses. For a part not described in detail in an embodiment, refer to related description in another embodiment. For ease of description and brevity, for functions and performed steps of the apparatuses and devices provided in embodiments of this application, refer to related description in the method embodiments of this application. Mutual reference, combination, or reference may be made between the method embodiments and between the apparatus embodiments.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A communication apparatus, wherein the communication apparatus comprises:
   one or more processors; and
   a non-transitory computer readable medium storing a program to be executed by the one or more processors, wherein the program comprises instructions that when executed by the one or more processors, cause the apparatus to perform operations comprising:
   generating a requirement report frame, wherein the requirement report frame indicates that the communication apparatus performs a device-to-device (D2D) transmission, the requirement report frame comprises requirement report information, and the requirement report information comprises one or more pieces of the following information: an identifier of a receiver of the D2D transmission, information used to determine a traffic volume size of the D2D transmission, or a service type of the D2D transmission;

sending the requirement report frame to an access point;

after sending the requirement report frame to the access point, receiving a trigger frame sent by the access point, wherein the trigger frame comprises a user information field, the user information field comprises an identifier of the communication apparatus, resource allocation information, first indication information, and second indication information, the first indication information indicates that a resource unit indicated by the resource allocation information is used for the device-to-device (D2D) transmission, and the second indication information indicates that the communication apparatus is a sender of the D2D transmission; and performing the D2D transmission on the resource unit indicated by the resource allocation information.

2. The apparatus according to claim 1, wherein the user information field comprises 48 bits.

3. The apparatus according to claim 1, wherein the first indication information is located at a $40^{th}$ bit of the user information field.

4. The apparatus according to claim 1, wherein the second indication information is located at a $46^{th}$ bit of the user information field.

5. The apparatus according to claim 1, wherein the requirement report information is carried in a control information field of a high efficient control (HE-control) field in the requirement report frame, the requirement report frame further comprises a control identifier, the control identifier indicates that the control information field carries the requirement report information for the D2D transmission, and the control identifier is carried in a control identifier field of the HE-control field in the requirement report frame.

6. The apparatus according to claim 1, wherein the operations further comprise:

receiving a requirement report trigger frame sent by the access point before sending the requirement report frame to the access point, wherein the requirement report trigger frame is a buffer report trigger frame, the buffer report trigger frame comprises third indication information, and the third indication information indicates that the communication apparatus is allowed to send the requirement report frame for the D2D transmission.

7. The apparatus according to claim 6, wherein the third indication information is located at a $40^{th}$ bit of a user information field in the buffer report trigger frame.

8. A communication apparatus, wherein the communication apparatus comprises:

one or more processors; and a non-transitory computer readable medium storing a program to be executed by the one or more processors, wherein the program comprises instructions that when executed by the one or more processors, cause the apparatus to perform operations comprising:

receiving a requirement report frame sent by a station, wherein the requirement report frame indicates that the station performs a device-to-device (D2D) transmission, the requirement report frame comprises requirement report information, and the requirement report information comprises one or more pieces of the following information: an identifier of the receiver of the D2D transmission, information used to determine a traffic volume size of the D2D transmission, or a service type of the D2D transmission;

after receiving the requirement report frame sent by the station, generating a trigger frame, wherein the trigger frame comprises a user information field, the user information field comprises an identifier of the station, resource allocation information, first indication information, and second indication information, the first indication information indicates that a resource unit indicated by the resource allocation information is used for the device-to-device (D2D) transmission, and the second indication information indicates that the station is a sender of the D2D transmission; and sending the trigger frame.

9. The apparatus according to claim 8, wherein the user information field comprises 48 bits.

10. The apparatus according to claim 8, wherein the first indication information is located at a 40th bit of the user information field.

11. The apparatus according to claim 8, wherein the second indication information is located at a 46th bit of the user information field.

12. The apparatus according to claim 8, wherein the requirement report information is carried in a control information field of a high efficient control (HE-control) field in the requirement report frame, the requirement report frame further comprises a control identifier, the control identifier indicates that the control information field carries the requirement report information for the D2D transmission, and the control identifier is carried in a control identifier field of the HE-control field in the requirement report frame.

13. The apparatus according to claim 8, wherein the operations further comprise:

sending a requirement report trigger frame to the station before receiving the requirement report frame sent by the station, wherein the requirement report trigger frame is a buffer report trigger frame, the buffer report trigger frame comprises third indication information, and the third indication information indicates that the station is allowed to send the requirement report information for the D2D transmission.

14. The apparatus according to claim 13, wherein the third indication information is located at a 40th bit of a user information field in the buffer report trigger frame.

15. A device-to-device (D2D) transmission method, wherein the method comprises:

generating, by a station, a requirement report frame, wherein the requirement report frame indicates that the station performs a D2D transmission, the requirement report frame comprises requirement report information, and the requirement report information comprises one or more pieces of the following information: an identifier of a receiver of the D2D transmission, information used to determine a traffic volume size of the D2D transmission, or a service type of the D2D transmission;

sending the requirement report frame to an access point;

after sending the requirement report frame to the access point, receiving, by the station, a trigger frame sent by the access point, wherein the trigger frame comprises a user information field, the user information field comprises an identifier of the station, resource allocation information, first indication information, and second indication information, the first indication information indicates that a resource unit indicated by the resource allocation information is used for the D2D transmission, and the second indication information indicates that the station is a sender of the D2D transmission; and performing, by the station, the D2D transmission on the resource unit indicated by the resource allocation information.

16. The method according to claim 15, wherein the user information field comprises 48 bits.

17. The method according to claim 15, wherein the first indication information is located at a $40^{th}$ bit of the user information field.

18. The method according to claim 15, wherein the second indication information is located at a $46^{th}$ bit of the user information field.

19. The method according to claim 15, wherein the requirement report information is carried in a control information field of a high efficient control (HE-control) field in the requirement report frame, the requirement report frame further comprises a control identifier, the control identifier indicates that the control information field carries the requirement report information for the D2D transmission, and the control identifier is carried in a control identifier field of the HE-control field in the requirement report frame.

20. The method according to claim 15, further comprising:

receiving a requirement report trigger frame sent by the access point before sending the requirement report frame to the access point, wherein the requirement report trigger frame is a buffer report trigger frame, the buffer report trigger frame comprises third indication information, and the third indication information indicates that the station is allowed to send the requirement report frame for the D2D transmission.

* * * * *